US012530643B2

(12) United States Patent
Fisher et al.

(10) Patent No.: US 12,530,643 B2
(45) Date of Patent: Jan. 20, 2026

(54) FLEET MANAGEMENT SYSTEM FOR PORTABLE MAINTENANCE TOOLS

(71) Applicant: FISHER-ROSEMOUNT SYSTEMS, INC., Round Rock, TX (US)

(72) Inventors: Joseph D. Fisher, Minnetonka, MN (US); Todd M. Toepke, Eden Prairie, MN (US); Nicholas T. Meyer, Fayetteville, GA (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 258 days.

(21) Appl. No.: 18/113,378

(22) Filed: Feb. 23, 2023

(65) Prior Publication Data

US 2023/0196233 A1 Jun. 22, 2023

Related U.S. Application Data

(62) Division of application No. 15/214,632, filed on Jul. 20, 2016, now Pat. No. 11,605,037.

(51) Int. Cl.
*G06Q 10/06* (2023.01)
*G05B 19/042* (2006.01)
(Continued)

(52) U.S. Cl.
CPC ..... *G06Q 10/06313* (2013.01); *G05B 19/042* (2013.01); *G06Q 10/20* (2013.01);
(Continued)

(58) Field of Classification Search
CPC ....... G06Q 10/06312; G06Q 10/06313; G06Q 10/20; G05B 2219/23406;
(Continued)

(56) References Cited

U.S. PATENT DOCUMENTS 4,638,396 A 1/1987 Mukli et al.
4,741,031 A 4/1988 Grandstaff
(Continued)

FOREIGN PATENT DOCUMENTS

CA 2 939 169 A1 8/2015
CA 2 762 092 C 10/2016
(Continued)

OTHER PUBLICATIONS

"Feature Article 2 Mobile Device Management (MDM): Introduction, Support for utilization of smartphones", Telecommunication, 28(9):40-45 (2011).
(Continued)

*Primary Examiner* — Bharat Barot
(74) *Attorney, Agent, or Firm* — MARSHALL, GERSTEIN & BORUN LLP

(57) ABSTRACT

An industrial service device fleet management system implements an organized and easy to use methodology to manage the digital content stored on each of a plurality of portable or stationary devices used in a plant, such as portable maintenance devices, to assure that each of the portable devices receives or implements only the content that it is supposed to have and is upgraded at the appropriate time to include new content, features, etc. The fleet management system includes a memory for storing information related to the fleet of portable or stationary devices including device identifications, device descriptions, end user names and privileges, the current content of each of the portable devices, and templates defining configuration parameters for the portable or stationary devices. The system also includes a content downloader that obtains, stores, and downloads content (such as software and firmware upgrades, additional features, applications, drivers, knowledge articles, etc.) for execution or display in various ones of the portable or
(Continued)

stationary devices, includes a content decider module that analyzes when and if various ones of the portable or stationary devices should be provided additional or new content, and includes a notification system that notifies users of the portable or stationary devices of the need to upgrade or provide new content to the portable or stationary devices.

14 Claims, 5 Drawing Sheets

(51) Int. Cl.
    *G06Q 10/0631*    (2023.01)
    *G06Q 10/20*    (2023.01)
    *H04L 9/40*    (2022.01)
    *H04L 67/00*    (2022.01)
    *H04L 67/06*    (2022.01)
    *H04L 67/12*    (2022.01)

(52) U.S. Cl.
    CPC .......... *H04L 63/102* (2013.01); *H04L 63/107* (2013.01); *H04L 67/06* (2013.01); *H04L 67/12* (2013.01); *H04L 67/34* (2013.01); *G05B 2219/23406* (2013.01); *G05B 2219/33192* (2013.01)

(58) Field of Classification Search
    CPC .......... G05B 2219/23408; H04L 67/06; H04L 67/12; H04L 67/34
    USPC ...................................................... 726/4, 21
    See application file for complete search history.

(56) References Cited

U.S. PATENT DOCUMENTS

| | | | |
|---|---|---|---|
| 5,136,630 | A | 8/1992 | Breneman et al. |
| 5,999,740 | A | 12/1999 | Rowley |
| 6,035,423 | A | 3/2000 | Hodges et al. |
| 6,211,649 | B1 | 4/2001 | Matsuda |
| 6,282,709 | B1 | 8/2001 | Reha et al. |
| 6,301,527 | B1 | 10/2001 | Butland et al. |
| 6,304,977 | B1 | 10/2001 | Forster et al. |
| 6,453,207 | B1 | 9/2002 | Holmes et al. |
| 6,629,059 | B2 | 9/2003 | Borgeson et al. |
| 6,704,737 | B1 | 3/2004 | Nixon et al. |
| 6,788,980 | B1 | 9/2004 | Johnson |
| 6,847,916 | B1 | 1/2005 | Ying |
| 6,889,166 | B2 | 5/2005 | Zielinski et al. |
| 6,959,356 | B2 | 10/2005 | Packwood et al. |
| 7,010,294 | B1 | 3/2006 | Pyotsia et al. |
| 7,016,741 | B2 | 3/2006 | Arntson |
| 7,039,744 | B2 | 5/2006 | Mathiowetz et al. |
| 7,051,143 | B2 | 5/2006 | White, III et al. |
| 7,117,122 | B2 | 10/2006 | Zielinski et al. |
| 7,177,122 | B2 | 2/2007 | Hou et al. |
| 7,181,550 | B2 | 2/2007 | Shepard et al. |
| 7,227,656 | B1 | 6/2007 | Kato |
| 7,289,994 | B2 | 10/2007 | Nixon et al. |
| 7,328,078 | B2 | 2/2008 | Sanford et al. |
| 7,421,531 | B2 | 9/2008 | Rotvold et al. |
| 7,451,606 | B2 | 11/2008 | Harrod |
| 7,454,553 | B2 | 11/2008 | Nelson et al. |
| 7,474,929 | B2 | 1/2009 | Nixon et al. |
| 7,512,521 | B2 | 3/2009 | Duren et al. |
| 7,539,978 | B1 | 5/2009 | Haddox et al. |
| 7,568,000 | B2 | 7/2009 | Keyes et al. |
| 7,574,706 | B2 | 8/2009 | Meulemans et al. |
| 7,620,948 | B1 | 11/2009 | Rowe et al. |
| 7,668,830 | B2 | 2/2010 | Hakala |
| 7,675,932 | B2 | 3/2010 | Schumacher |
| 7,680,549 | B2 | 3/2010 | Kavaklioglu et al. |
| 7,839,890 | B1 | 11/2010 | Neitzel et al. |
| 7,840,296 | B2 | 11/2010 | Sanford et al. |
| 7,975,266 | B2 | 7/2011 | Schneider et al. |
| 8,055,371 | B2 | 11/2011 | Sanford et al. |
| 8,112,565 | B2 | 2/2012 | Russell, III et al. |
| 8,127,241 | B2 | 2/2012 | Blevins et al. |
| 8,180,948 | B2 | 5/2012 | Kreider et al. |
| 8,200,702 | B2 | 6/2012 | Herbeck et al. |
| 8,204,717 | B2 | 6/2012 | McLaughlin et al. |
| 8,286,154 | B2 | 10/2012 | Kaakani et al. |
| 8,296,494 | B1 | 10/2012 | Sheffield |
| 8,332,567 | B2 | 12/2012 | Burr et al. |
| 8,344,542 | B2 | 1/2013 | Micallef et al. |
| 8,390,150 | B2 | 3/2013 | Vande Vusse et al. |
| 8,458,659 | B2 | 6/2013 | Resnick et al. |
| 8,626,916 | B2 | 1/2014 | Armstrong et al. |
| 8,725,081 | B2 | 5/2014 | Kantzes et al. |
| 8,762,745 | B2 | 6/2014 | Seiler |
| 8,766,794 | B2 | 7/2014 | Ferguson et al. |
| 8,769,622 | B2 | 7/2014 | Chang et al. |
| 8,782,249 | B1 | 7/2014 | Hood et al. |
| 8,789,144 | B2 | 7/2014 | Mazzaferri et al. |
| 8,908,666 | B2 | 12/2014 | Nixon et al. |
| 8,914,783 | B2 | 12/2014 | Van Camp |
| 8,949,665 | B2 | 2/2015 | Law et al. |
| 9,003,387 | B2 | 4/2015 | Van Camp et al. |
| 9,182,783 | B2 | 11/2015 | Wada |
| 9,244,455 | B2 | 1/2016 | Peterson et al. |
| 9,495,313 | B2 | 11/2016 | Burr et al. |
| 9,541,905 | B2 | 1/2017 | Nixon et al. |
| 9,582,259 | B2 | 2/2017 | Chee et al. |
| 9,615,149 | B1 | 4/2017 | Kajjam et al. |
| 9,684,296 | B2 | 6/2017 | Russell, III et al. |
| 9,736,783 | B2 | 8/2017 | Yonezawa et al. |
| 9,761,924 | B2 | 9/2017 | Lagnado et al. |
| 9,778,626 | B2 | 10/2017 | Nixon et al. |
| 9,898,925 | B2 | 2/2018 | Gunzert et al. |
| 10,771,830 | B2 * | 9/2020 | Velayudhan ....... H04N 21/2146 |
| 11,605,037 | B2 * | 3/2023 | Fisher .............. G06Q 10/06313 |
| 11,888,739 | B2 * | 1/2024 | Mehmedagic ...... H04L 41/0806 |
| 2002/0167904 | A1 | 11/2002 | Borgeson et al. |
| 2003/0023795 | A1 | 1/2003 | Packwood et al. |
| 2003/0093519 | A1 | 5/2003 | Jackson et al. |
| 2003/0109937 | A1 | 6/2003 | Zielinski et al. |
| 2003/0229472 | A1 | 12/2003 | Kantzes et al. |
| 2004/0039458 | A1 | 2/2004 | Mathiowetz et al. |
| 2004/0054829 | A1 | 3/2004 | White et al. |
| 2004/0103165 | A1 | 5/2004 | Nixon et al. |
| 2004/0172207 | A1 | 9/2004 | Hancock et al. |
| 2004/0181787 | A1 | 9/2004 | Wickham et al. |
| 2004/0230401 | A1 | 11/2004 | Duren et al. |
| 2005/0132348 | A1 | 6/2005 | Meulemans et al. |
| 2005/0132349 | A1 | 6/2005 | Roberts et al. |
| 2005/0182501 | A1 | 8/2005 | Franchuk et al. |
| 2005/0228798 | A1 | 10/2005 | Shepard et al. |
| 2005/0261988 | A1 | 11/2005 | Horel et al. |
| 2005/0268107 | A1 | 12/2005 | Harris et al. |
| 2005/0276233 | A1 | 12/2005 | Shepard et al. |
| 2006/0106806 | A1 | 5/2006 | Sperling et al. |
| 2007/0004168 | A1 | 1/2007 | Zips |
| 2007/0022403 | A1 | 1/2007 | Brandt et al. |
| 2007/0118699 | A1 | 5/2007 | Synard et al. |
| 2007/0142936 | A1 | 6/2007 | Denison et al. |
| 2007/0169079 | A1 | 7/2007 | Keller et al. |
| 2007/0183108 | A1 | 8/2007 | Uhlenberg et al. |
| 2007/0186010 | A1 | 8/2007 | Hall et al. |
| 2007/0288551 | A1 | 12/2007 | Sidon |
| 2008/0040449 | A1 | 2/2008 | Grant et al. |
| 2008/0049984 | A1 | 2/2008 | Poo et al. |
| 2008/0075012 | A1 | 3/2008 | Zielinski et al. |
| 2008/0081579 | A1 | 4/2008 | Chen et al. |
| 2008/0114911 | A1 | 5/2008 | Schumacher |
| 2008/0122611 | A1 | 5/2008 | Nagashima et al. |
| 2008/0126005 | A1 | 5/2008 | Guenter et al. |
| 2008/0126665 | A1 | 5/2008 | Burr et al. |
| 2008/0156090 | A1 | 7/2008 | Wehrs |
| 2008/0189400 | A1 | 8/2008 | Norrie et al. |
| 2008/0268784 | A1 | 10/2008 | Kantzes et al. |
| 2009/0052429 | A1 | 2/2009 | Pratt, Jr. et al. |
| 2009/0065578 | A1 | 3/2009 | Peterson et al. |
| 2009/0094462 | A1 | 4/2009 | Madduri |

(56) References Cited

U.S. PATENT DOCUMENTS

| | | |
|---|---|---|
| 2009/0133012 A1 | 5/2009 | Shih |
| 2009/0138870 A1 | 5/2009 | Shahindoust et al. |
| 2009/0271726 A1 | 10/2009 | Gavimath et al. |
| 2009/0320125 A1 | 12/2009 | Pleasant, Jr. et al. |
| 2010/0013325 A1 | 1/2010 | Vande Vusse et al. |
| 2010/0077111 A1 | 3/2010 | Holmes et al. |
| 2010/0146497 A1 | 6/2010 | Kogan et al. |
| 2010/0149997 A1 | 6/2010 | Law et al. |
| 2010/0189251 A1 | 7/2010 | Curren |
| 2011/0040627 A1* | 2/2011 | Brewer ............... G06Q 30/02 705/14.64 |
| 2011/0072506 A1 | 3/2011 | Law et al. |
| 2011/0078114 A1 | 3/2011 | Herbeck et al. |
| 2011/0087461 A1 | 4/2011 | Hollander et al. |
| 2011/0153786 A1 | 6/2011 | Merkel et al. |
| 2011/0163776 A1 | 7/2011 | Xie |
| 2011/0224808 A1 | 9/2011 | Lucas et al. |
| 2011/0238188 A1 | 9/2011 | Washiro |
| 2011/0286542 A1 | 11/2011 | Shelburne |
| 2012/0038458 A1 | 2/2012 | Toepke et al. |
| 2012/0038760 A1 | 2/2012 | Kantzes et al. |
| 2012/0087656 A1 | 4/2012 | Rourke et al. |
| 2012/0236769 A1 | 9/2012 | Powell et al. |
| 2013/0024495 A1 | 1/2013 | Armstrong et al. |
| 2013/0070745 A1 | 3/2013 | Nixon et al. |
| 2013/0124465 A1* | 5/2013 | Pingel ............... H04L 67/12 707/610 |
| 2013/0151849 A1 | 6/2013 | Graham et al. |
| 2013/0214898 A1 | 8/2013 | Pineau et al. |
| 2013/0232541 A1 | 9/2013 | Kapadia et al. |
| 2013/0290706 A1 | 10/2013 | Socky et al. |
| 2014/0018955 A1 | 1/2014 | Asakawa et al. |
| 2014/0019768 A1 | 1/2014 | Pineau et al. |
| 2014/0036911 A1 | 2/2014 | Edgar et al. |
| 2014/0047107 A1 | 2/2014 | Maturana et al. |
| 2014/0056173 A1 | 2/2014 | Nakamura et al. |
| 2014/0096212 A1 | 4/2014 | Smith et al. |
| 2014/0165182 A1 | 6/2014 | Curry et al. |
| 2014/0181955 A1 | 6/2014 | Rosati |
| 2014/0198420 A1 | 7/2014 | Kojovic |
| 2014/0203919 A1 | 7/2014 | Baker et al. |
| 2014/0226243 A1 | 8/2014 | Williams et al. |
| 2014/0257756 A1 | 9/2014 | van der Linde |
| 2014/0273847 A1 | 9/2014 | Nixon et al. |
| 2014/0277596 A1 | 9/2014 | Nixon et al. |
| 2014/0277615 A1 | 9/2014 | Nixon et al. |
| 2014/0277617 A1 | 9/2014 | Nixon et al. |
| 2014/0282015 A1 | 9/2014 | Nixon et al. |
| 2014/0314087 A1 | 10/2014 | Kusano |
| 2014/0336785 A1* | 11/2014 | Asenjo ............... G06Q 10/06 700/17 |
| 2015/0024710 A1 | 1/2015 | Becker et al. |
| 2015/0040179 A1 | 2/2015 | Sobel |
| 2015/0074749 A1 | 3/2015 | Vasko et al. |
| 2015/0098158 A1 | 4/2015 | Kemp et al. |
| 2015/0127876 A1 | 5/2015 | Erni et al. |
| 2015/0134289 A1 | 5/2015 | Mrvaljevic et al. |
| 2015/0156285 A1 | 6/2015 | Blair |
| 2015/0156286 A1 | 6/2015 | Blair |
| 2015/0281227 A1 | 10/2015 | Fox Ivey et al. |
| 2015/0358331 A1 | 12/2015 | Rachalwar et al. |
| 2016/0026813 A1 | 1/2016 | Neitzel et al. |
| 2016/0076664 A1 | 3/2016 | Erni |
| 2016/0084729 A1 | 3/2016 | Huseynov et al. |
| 2016/0132046 A1 | 5/2016 | Beoughter et al. |
| 2016/0154394 A1 | 6/2016 | Peterson et al. |
| 2016/0291579 A1 | 10/2016 | Holmstadt et al. |
| 2016/0299175 A1 | 10/2016 | Dewey et al. |
| 2016/0305800 A1 | 10/2016 | Hocker et al. |
| 2016/0352534 A1 | 12/2016 | Ringkamp et al. |
| 2016/0359866 A1 | 12/2016 | Mixer |
| 2016/0378454 A1 | 12/2016 | Nekrestyanov et al. |
| 2017/0078265 A1 | 3/2017 | Sundaresh et al. |
| 2017/0093884 A1 | 3/2017 | Al Abdulhadi et al. |
| 2017/0171096 A1 | 6/2017 | Bunte et al. |
| 2017/0180355 A1 | 6/2017 | Enns et al. |
| 2017/0187200 A1 | 6/2017 | Somerville et al. |
| 2017/0220657 A1 | 8/2017 | Nivala et al. |
| 2017/0257262 A1 | 9/2017 | Dalal |
| 2017/0257378 A1 | 9/2017 | Sprenger et al. |
| 2017/0322850 A1 | 11/2017 | Yang et al. |
| 2017/0336947 A1* | 11/2017 | Bliss ............... G06Q 10/20 |
| 2018/0026840 A1 | 1/2018 | Toepke et al. |
| 2018/0027054 A1 | 1/2018 | Toepke et al. |
| 2018/0027071 A1 | 1/2018 | Toepke et al. |
| 2018/0123795 A1 | 5/2018 | Norman et al. |
| 2018/0210428 A1 | 7/2018 | Jundt et al. |

FOREIGN PATENT DOCUMENTS

| | | |
|---|---|---|
| CN | 1533664 A | 9/2004 |
| CN | 1550944 A | 12/2004 |
| CN | 1561472 A | 1/2005 |
| CN | 1598726 A | 3/2005 |
| CN | 1599891 A | 3/2005 |
| CN | 101013318 A | 8/2007 |
| CN | 101103354 A | 1/2008 |
| CN | 101149619 A | 3/2008 |
| CN | 101151865 A | 3/2008 |
| CN | 101201625 A | 6/2008 |
| CN | 101277300 A | 10/2008 |
| CN | 101410800 A | 4/2009 |
| CN | 101669153 A | 3/2010 |
| CN | 201489652 U | 5/2010 |
| CN | 101739007 A | 6/2010 |
| CN | 102239452 A | 11/2011 |
| CN | 202057736 U | 11/2011 |
| CN | 102356364 A | 2/2012 |
| CN | 102356618 A | 2/2012 |
| CN | 202394086 U | 8/2012 |
| CN | 102890481 A | 1/2013 |
| CN | 202794497 U | 3/2013 |
| CN | 202903993 U | 4/2013 |
| CN | 103324097 A | 9/2013 |
| CN | 103348353 A | 10/2013 |
| CN | 103563294 A | 2/2014 |
| CN | 103828477 A | 5/2014 |
| CN | 104049585 A | 9/2014 |
| CN | 104049588 A | 9/2014 |
| CN | 104049592 A | 9/2014 |
| CN | 104423370 A | 3/2015 |
| CN | 104521219 A | 4/2015 |
| CN | 104678798 A | 6/2015 |
| CN | 105075396 A | 11/2015 |
| CN | 105548800 A | 5/2016 |
| CN | 105785853 A | 7/2016 |
| EP | 0 929 855 A1 | 7/1999 |
| EP | 1 477 952 A2 | 11/2004 |
| EP | 1 816 530 A1 | 8/2007 |
| EP | 1 906 623 A1 | 4/2008 |
| EP | 1 976 249 A1 | 10/2008 |
| EP | 2 026 223 A2 | 2/2009 |
| EP | 2 067 088 A2 | 6/2009 |
| EP | 2 200 139 A2 | 6/2010 |
| EP | 2 310 922 A1 | 4/2011 |
| EP | 2 701 024 A2 | 2/2014 |
| EP | 2 782 073 A1 | 9/2014 |
| EP | 3 377 972 A1 | 9/2018 |
| GB | 2 452 635 A | 3/2009 |
| GB | 2 465 495 A | 5/2010 |
| GB | 2 535 839 A | 8/2016 |
| GB | 2 539 311 A | 12/2016 |
| GB | 2 548 007 A | 9/2017 |
| GB | 2 552 417 A | 1/2018 |
| GB | 2 510 721 B | 2/2020 |
| GB | 2 513 708 B | 8/2020 |
| GB | 2 514 644 B | 12/2020 |
| GB | 2 513 956 B | 1/2021 |
| GB | 2 535 839 B | 6/2021 |
| JP | 2002-007129 A | 1/2002 |
| JP | 2003-018678 A | 1/2003 |
| JP | 2004-234056 A | 8/2004 |
| JP | 2005-512219 A | 4/2005 |
| JP | 2005-167363 A | 6/2005 |

(56) References Cited

FOREIGN PATENT DOCUMENTS

| | | |
|---|---|---|
| JP | 2005-522069 A | 7/2005 |
| JP | 2006-039892 A | 2/2006 |
| JP | 2008-90845 A | 4/2008 |
| JP | 2008-535106 A | 8/2008 |
| JP | 2008-546116 A | 12/2008 |
| JP | 2009-187420 A | 8/2009 |
| JP | 2010-509839 A | 3/2010 |
| JP | 2010-152878 A | 7/2010 |
| JP | 2010-524127 A | 7/2010 |
| JP | 2010-231473 A | 10/2010 |
| JP | 2011-066881 A | 3/2011 |
| JP | 2011-086012 A | 4/2011 |
| JP | 2011-198236 A | 10/2011 |
| JP | 2011-528478 A | 11/2011 |
| JP | 2013-535739 A | 9/2013 |
| JP | 2013-225203 A | 10/2013 |
| JP | 2014-032633 A | 2/2014 |
| JP | 2014-042137 A | 3/2014 |
| JP | 2014-526095 A | 10/2014 |
| JP | 2014-222526 A | 11/2014 |
| JP | 2014-530545 A | 11/2014 |
| JP | 2014-225236 A | 12/2014 |
| JP | 2014-225240 A | 12/2014 |
| JP | 2015-90694 A | 5/2015 |
| JP | 2015-185931 A | 10/2015 |
| JP | 2016-129025 A | 7/2016 |
| WO | WO-98/14855 A1 | 4/1998 |
| WO | WO-2006/133308 A1 | 12/2006 |
| WO | WO-2008/045258 A2 | 4/2008 |
| WO | WO-2009/154748 A2 | 12/2009 |
| WO | WO-2010/009211 A1 | 1/2010 |
| WO | WO-2013/184117 A1 | 12/2013 |
| WO | WO-2014/105263 A1 | 7/2014 |
| WO | WO-2015/032361 A1 | 3/2015 |
| WO | WO-2016/020165 A1 | 2/2016 |
| WO | WO-2017/085923 A1 | 5/2017 |

OTHER PUBLICATIONS

Beamex MC5 (discontinued) description, Retrieved from the internet at http://www.beamex.com/beamex_products/MC5-%28discounted%29/na15ghgl/355ca6b7-66ff-469f-9bd4-1f26c0870452#Features> (Jul. 8, 2016).
Beamex MC6 Advanced Field Calibrator and Communicator, Product Brochure (2016).
Costall, "Essential Concepts of Intrinsic Safety," Spark Institute. Retrieved from the internet at <http://www.sparkinstitute.ca/wp/WP00_-_Essential_Concepts_of_Intrinsic_Safety.pdf> (May 24, 2016).
Decision of Refusal for Japanese Application No. 2017-139312, dated Mar. 8, 2022.
Decision of Refusal for Japanese Application No. 2017-140769, dated Mar. 8, 2022.
Emerson Process Management, "475 Field Communicator." Retrieved from the internet at <http://www2.emersonprocess.com/siteadmincenter/PM%20Asset%20Optimization%20Documents/ProductReferenceAndGuides/475_ru_usermanual.pdf> (May 26, 2016).
Examination Report for Application No. GB1709952.4, dated Aug. 27, 2021.
Examination Report for Application No. GB1709952.4, dated May 20, 2021.
Examination Report for Application No. GB1710027.2, dated Sep. 1, 2021.
Examination Report for Application No. GB1710029.8, dated Jul. 5, 2021.
Examination Report for Application No. GB1710029.8, dated Sep. 17, 2021.
Examination Report for Application No. GB1710117.1, dated Aug. 27, 2021.
Examination Report for Application No. GB1710119.7, dated Aug. 31, 2021.
Examination Report for Application No. GB1710124.7, dated Sep. 20, 2021.
Examination Report for Application No. GB1710125.4, dated Sep. 2, 2021.
Examination Report for Application No. GB1710266.6, dated Oct. 8, 2021.
Examination Report for Application No. GB1711106.3, dated Sep. 21, 2021.
Examination Report for India Application No. 201621025382, dated Sep. 19, 2019.
Examination Report Under Section 18(3) in Application No. GB1015879.8, dated Mar. 13, 2014.
Examination Report Under Section 18(3) in Application No. GB1015879.8, dated Mar. 20, 2015.
Examination Report under Section 18(3) dated Oct. 2, 2014 in Application No. GB1015879.8, 3 pgs.
Fieldbus Engineer's Guide, Pepperl+Fuchs (May 2013), 474 pages.
Fieldbus Foundation, "Foundation Fieldbus Application Guide; 31,25 kbit/s Intrinsically Safe Systems." Retrieved from the internet at <http://www.fieldbus.org/images/stories/enduserresources/technicalreferences/documents/instrinsciallysafesystems.pdf> (May 26, 2016).
First Examination Report for Indian Patent Application No. 201621025381, dated Oct. 31, 2019.
First Examination Report for Indian Patent Application No. 201621025383, dated Feb. 27, 2020.
First Office Action for corresponding Chinese Patent Application No. 201010572412.4, Dated: Jun. 5, 2014, 8 pgs.
Fluke 709 Precision Loop Calibrator, User Manual, © 2013 Fluke Corporation.
Fluke 709/709H Precision Loop Calibrator, Quick Reference Guide (2013).
GE Measurement & Control Systems, Druck DPI 620-IS advanced modular calibrator user manual, © Druck Limited 2010.
Nikkei Electronics/Nikkei Communication, "Android Security Bible 2013" First Edition, Nov. 30, 2012, Nikkei BP Inc., p. 248-256.
Notice of Reason for Rejection for Japanese Application No. 2017-143876, dated Apr. 6, 2021.
Notice of Reason for Rejection for Japanese Application No. 2017-143877, dated Apr. 6, 2021.
Notice of Reason for Rejection for Japanese Application No. 2017-143878, dated May 18, 2021.
Notification of Reasons for Refusal for Japanese Application No. 2017-139304, dated Jul. 6, 2021.
Notification of Reasons for Refusal for Japanese Application No. 2017-139311, dated Jul. 6, 2021.
Notification of Reasons for Refusal for Japanese Application No. 2017-139312, dated May 11, 2021.
Notification of Reasons for Refusal for Japanese Application No. 2017-139312, dated Nov. 16, 2021.
Notification of Reasons for Refusal for Japanese Application No. 2017-140769, dated May 11, 2021.
Notification of Reasons for Refusal for Japanese Application No. 2017-140769, dated Nov. 16, 2021.
Notification of Reasons for Refusal for Japanese Application No. 2017-140819, dated Feb. 1, 2022.
Notification of Reasons for Refusal for Japanese Application No. 2017-140819, dated Jun. 15, 2021.
Notification of Reasons for Refusal for Japanese Application No. 2017-140825, dated Apr. 16, 2021.
Notification of the First Office Action for Chinese Application No. 201710595776.6, dated Aug. 18, 2021.
Notification of the First Office Action for Chinese Application No. 201710596394.5, dated Aug. 30, 2021.
Notification of the First Office Action for Chinese Application No. 201710598842.5, dated Aug. 31, 2021.
Notification of the First Office Action for Chinese Application No. 201710598845.9, dated Jul. 12, 2021.
Notification of the First Office Action for Chinese Application No. 201710599064.1, dated Sep. 1, 2021.
Notification of the First Office Action for Chinese Application No. 201710599065.6, dated Sep. 1, 2021.

(56) References Cited

OTHER PUBLICATIONS

Notification of the First Office Action for Chinese Application No. 201710610352.2, dated Jul. 29, 2021.
Notification of the First Office Action for Chinese Application No. 201710610412.0, dated Jul. 23, 2021.
Notification of the First Office Action for Chinese Application No. 201710610437.0, dated Aug. 5, 2021.
Notification of the Second Office Action for Chinese Application No. 201710596394.5, dated Feb. 23, 2022.
Notification of the Second Office Action for Chinese Application No. 201710596394.59, dated Feb. 23, 2022.
Notification of the Second Office Action for Chinese Application No. 201710598845.9, dated Jan. 17, 2022.
Notification of the Second Office Action for Chinese Application No. 201710610352.2, dated Mar. 3, 2022.
Office Action for corresponding Japanese Patent Application No. 2010-215391, Dated: Aug. 19, 2014, 4 pgs.
Office Action for Japanese Application No. 2017-139299, dated Aug. 17, 2021.
Omega, "Digital Signal Transmission." Retrieved from the internet at <https://www.omega.com/literature/transactions/volume2/digitalsignal4.html> (May 26, 2016).
Omega, "Understanding What's Meant by Intrinsically Safe." Retrieved from the internet at <http://www.omega.com/technical-learning/understanding-what-is-meant-by-intrinsically-safe.html> (May 26, 2016).
Search and Examination Report for Application No. GB1709952.4, dated Jan. 26, 2022.
Search Report for Application No. GB1015879.8, dated Jan. 13, 2011.
Search Report for Application No. GB1709952.4, dated Nov. 29, 2017.
Search Report for Application No. GB1710027.2, dated Oct. 19, 2017.
Search Report for Application No. GB1710029.8, dated Dec. 21, 2017.
Search Report for Application No. GB1710117.1, dated Oct. 23, 2017.
Search Report for Application No. GB1710119.7, dated Oct. 24, 2017.
Search Report for Application No. GB1710124.7, dated Oct. 20, 2017.
Search Report for Application No. GB1710125.4, dated Oct. 12, 2017.
Search Report for Application No. GB1710210.4, dated Oct. 26, 2017.
Search Report for Application No. GB1710211.2, dated Nov. 30, 2017.
Search Report for Application No. GB1710266.6, dated Dec. 19, 2017.
Search Report for Application No. GB1711106.3, dated Nov. 21, 2017.
U.S. Appl. No. 14/682,714, filed Apr. 9, 2015.
U.S. Appl. No. 15/214,949, filed Jul. 20, 2016.
U.S. Appl. No. 15/214,975, filed Jul. 20, 2016.
U.S. Appl. No. 15/216,810, filed Jul. 22, 2016.
User Manual for Beamex® MC6 Advanced Field Calibrator and Communicator (2012-2015).
White, How Computers Work, QUE 7th (2003).
Wikipedia, "Intrinsic Safety." Retrieved from the internet at <https://en.wikipedia.org/wiki/Intrinsic_safety> (May 24, 2016).
Wiring and Installation 31.25 kbit/s, Voltage Mode, Wire Medium, Application Guide, FoundationTM Fieldbus, © 1996 Fieldbus Foundation.
"31,25 kbit/s Intrinsically Safe Systems," Fieldbus Foundation (2004), 77 pages.
"Instrinsic Safety" (2016) Retrieved from the Internet at: <https://en.wikipedia.org/wiki/Intrinsic_safety>, 3 pages.
"Understanding What's Meant by 'Instrinsically Safe,'" Omega (2016) Retrieved from the Internet at: <http://www.omega.com/technical-learning/understanding-what-is-meant-by-intrinsically-safe.html>, 4 pages.
Costall, Essential Concepts of Intrinsic Safety, Spark Institute, (2016).
Costall, Sr., Sean, "Essential Concepts of Intrinsic Safety," Spark Institute (2013), 4 pages.
Digital Signal Transmission, Omega (2016) Retrieved from the Internet at: <https://www.omega.com/literature/transactions/volume2/digitalsignal4.html>, 5 pages.
Emerson Process Management, "475 Field Communicator", dated May 2015.
Fieldbus Foundation, "Foundation Fieldbus Application Guide 31,25 kbit/s Intrinsically Safe Systems", (1996-2004).
MyBeamex, "Beamer MC5 (discontinued)". Retrieved from the internet at http://www.beamex.com/beamex_products/MC5-%28discounted%29/na15ghgl/355ca6b7-66ff-469f-9bd4-1f26c0870452#Features> (2016).
Omega, "Digital Signal Transmission". Retrieved from the internet at <https://www.omega.com/literature/transactions/volume2/digitalsignal4.html> (2016).
Omega, "Understanding What's Meant by Intrinsically Safe". Retrieved from the internet at <http://www.omega.com/technical-learning/understanding-what-is-meant-by-intrinsically-safe.html> (2016).
Pepperl+Fuchs, "Fieldbus Engineer's Guide". Retrieved from the internet at <http://files.pepperl-fuchs.com/selector_files/navi/productInfo/doct/tdoct3032_eng.pdf> (2016).
Pepperl+Fuchs, "Fieldbus Engineer's Guide." Retrieved from the internet at <http://files.pepperl-fuchs.com/selector_files/navi/productInfo/doct/tdoct3032_eng.pdf> (Jun. 2, 2016).
User's Manual: 475 Field Communicator, Emerson Process Management (May 2015), 131 pages.
Wikipedia, "Intrinsic Safety". Retrieved from the internet at <https://en.wikipedia.org/wiki/Intrinsic_safety> (2016).
Examination Report for Application No. GB1711106.3, dated Feb. 7, 2022.
Notification of the Second Office Action for Chinese Application No. 201710598842.5, dated Mar. 16, 2022.
Search Report for Application No. GB2202926.8, dated Apr. 4, 2022.
Decision of Rejection for Chinese Application No. 201710598845.9, dated Apr. 6, 2022.
Notification of the Thrid Office Action for Chinese Application No. 201710596394.5, dated May 18, 2022.
Notification of the Second Office Action for Chinese Application No. 201710595776.6, dated Jun. 8, 2022.
Decision of Rejection for Chinese Application No. 201710598842.5, dated Jun. 15, 2022.
Combination Search and Examination Report for Application No. GB22050293.8, dated May 26, 2022.
Combination Search and Examination Report for Application No. GB2200484.0, dated Jul. 28, 2022.
Combination Search and Examination Report for Application No. GB2200853.6, dated Jul. 29, 2022.
Combination Search and Examination Report for Application No. GB2211045.6, dated Sep. 5, 2022.
Notification of the First Office Action for Chinese Application No. 201710596406.4, dated Sep. 14, 2022.
Decision of Rejection for Chinese Application No. 201710596394.5, dated Oct. 18, 2022.
Combination Search and Examination Report for Application No. GB2211049.8, dated Nov. 7, 2022.
Combination Search and Examination Report for Application No. GB2211061.3, dated Dec. 23, 2022.
Combination Search and Examination Report for Application No. GB2211066.2, dated Jan. 18, 2023.
Decision of Rejection for Chinese Application No. 201710595776.6, dated Dec. 13, 2022.
Notice of Reasons for Rejection for Japanese Application No. 2021-204298, dated Feb. 7, 2023.
Notice of Reasons for Rejection for Japanese Application No. 2022-007324, dated Mar. 14, 2023.

(56) References Cited

OTHER PUBLICATIONS

Notice of Reasons for Rejection for Japanese Application No. 2022-009796, dated Mar. 28, 2023.
Notice of Reasons for Rejection for Japanese Application No. 2022-009981, dated Apr. 4, 2023.

* cited by examiner

FLEET MANAGEMENT SYSTEM FOR PORTABLE MAINTENANCE TOOLS

CROSS-REFERENCE TO RELATED APPLICATION

This application is a divisional of U.S. application Ser. No. 15/214,632 filed Jul. 20, 2016, entitled "Fleet Management System for Portable Maintenance Tools," the entire disclosure of which is hereby expressly incorporated by reference herein.

TECHNICAL FIELD

The present disclosure relates generally to a portable field maintenance tools, and in particular, to a system for managing a fleet of a portable field maintenance tools.

BACKGROUND

Process control systems, like those used in chemical and petroleum processes, typically include one or more process controllers communicatively coupled to at least one host or operator workstation and to one or more field devices via analog, digital, or combined analog/digital communication links.

A process controller (sometimes referred to as a "controller"), which is typically located within the plant or other industrial environment, receives signals (sometimes referred to as "control inputs") indicative of process measurements and uses the information carried by these signals to implement control routines that cause the controller to generate control signals (sometimes referred to as "control outputs") based on the control inputs and the internal logic of the control routines. The controllers send the generated control signals over buses or other communication links to control operation of field devices. In some instances, the controllers may coordinate with control routines implemented by smart field devices, such as Highway Addressable Remote Transmitter (HART®), WirelessHART®, and FOUNDATION® Fieldbus (sometimes just called "Fieldbus") field devices. Moreover, in many cases, there may be plant or other industrial equipment that operates in the plant or other industrial setting to perform some function that is not under direct control of the process controller, such as vibration detection equipment, rotating equipment, electrical power generating equipment, etc.

The field devices that are typically associated with controller, which may be, for example, valves, valve positioners, switches, and transmitters (e.g., including temperature, pressure, level, or flow rate sensors), are located within the plant environment and generally perform physical or process control functions. For example, a valve may open or close in response to a control output received from a controller, or may transmit to a controller a measurement of a process parameter so that the controller can utilize the measurement as a control input. Smart field devices, such as field devices conforming to the Fieldbus protocol, may also perform control calculations, alarming functions, and other control functions commonly implemented within a process controller. Field devices may be configured to communicate with controllers and/or other field devices according to various communication protocols. For example, a plant may include traditional analog 4-20 mA field devices, HART® field devices, Fieldbus field devices, and/or other types of field devices.

Traditional analog 4-20 mA field devices communicate with a controller via a two-wire communication link (sometimes called a "loop" or "current loop") configured to carry a 4-20 mA DC signal indicative of a measurement or control command. For example, a level transmitter may sense a tank level and transmit via the loop a current signal corresponding to that measurement (e.g., a 4 mA signal for 0% full, a 12 mA signal for 50% full, and a 20 mA signal for 100% full). The controller receives the current signal, determines the tank level measurement based on the current signal, and takes some action based on the tank level measurement (e.g., opening or closing an inlet valve). Analog 4-20 mA field devices typically come in two varieties including four-wire field devices and two-wire field devices. A four-wire field device typically relies on a first set of wires (i.e., the loop) for communication, and a second set of wires for power. A two-wire field device relies on the loop for both communication and power. These two-wire field devices may be called "loop powered" field devices.

Process plants often implement traditional 4-20 mA systems due to the simplicity and effectiveness of the design. Unfortunately, traditional 4-20 mA current loops only transmit one process signal at a time. Thus, a set-up including a control valve and a flow transmitter on a pipe carrying material may require three separate current loops: one for carrying a 4-20 mA signal indicative of a control command for the valve (e.g., to move the valve to 60% open); a second for carrying a 4-20 mA signal indicative of the valve's actual position (e.g., so that the controller knows the degree to which the valve has responded to control commands); and a third for carrying a 4-20 mA signal indicative of a measured flow. As a result, a traditional 4-20 mA set-up in a plant having a large number of field devices may require extensive wiring, which can be costly and can lead to complexity when setting up and maintaining the communication system.

More recently, the process control industry has moved to implement digital communications within the process control environment. For example, the HART® protocol uses the loop DC magnitude to send and receive analog signals, but also superimposes an AC digital carrier signal on the DC signal to enable two-way field communications with smart field instruments. As another example, the Fieldbus protocol provides all-digital communications on a two-wire bus (sometimes called a "segment" or "Fieldbus segment"). This two-wire Fieldbus segment can be coupled to multiple field devices to provide power to the multiple field devices (via a DC voltage available on the segment) and to enable communication by the field devices (via an AC digital communication signal superimposed on the DC power supply voltage). Generally speaking, because the connected field devices use the same segment for communication and are connected in parallel, only one field device can transmit a message at any given time over the segment. Accordingly, communication on a segment is coordinated by a device designated as a link active scheduler (LAS). The LAS is responsible for passing a token between field devices connected to the segment. Only the device with the token may communicate over the segment at a particular time.

These digital communication protocols generally enable more field devices to be connected to a particular communication link, support more and faster communications between the field devices and the controller, and/or allow field devices to send more and different types of information (such as information pertaining to the status and configuration of the field device itself) to the process controller and other devices in or connected to the control network. Furthermore, these standard digital protocols enable field devices made by different manufacturers to be used together within the same process control network.

Regardless of the communication protocol utilized, field devices may require on-site setup, configuration, testing, and maintenance. For example, before a field device can be installed at a particular location at a process control plant, the field device may need to be programmed and may then need to be tested before and after the field device is installed. Field devices that are already installed may also need to be regularly checked for maintenance reasons or, for example, when a fault is detected and the field device needs to be diagnosed for service or repair. Generally speaking, configuration and testing of field devices are performed on location using a handheld maintenance tool, such as a portable testing device ("PTD"). Because many field devices are installed in remote, hard-to-reach locations, it is more convenient for a user to test the installed devices in such remote locations using a PTD rather than using a full configuration and testing device, which can be heavy, bulky, and non-portable, generally requiring the installed field device to be transported to the site of the diagnostic device.

When a user, such as a service technician, performs maintenance testing and/or communications with a field device, the PTD is typically communicatively connected to a communication link (e.g., a current loop or Fieldbus segment) or directly to a field device (e.g., via communication terminals of the field device). The PTD initially attempts to communicate with the field device, such as by sending and/or receiving digital communication signals along the loop or segment using the communication protocol supported by the field device. If the current loop or segment is in proper operating condition, the communications signals may be sent and/or received without problem. However, if the loop, segment, or field device contains an electrical fault, such as a short or a break, communications may be impeded, and it may be necessary to diagnose the loop, segment, and/or field device to identify the fault.

When such a fault is identified, a technician might need to use a variety of other tools to test the field device and/or communication link. For example, the technician may need to use a portable power supply to power an isolated field device. The technician may need to power an isolated field device, for example, when the field device loses power due to a plant-wide power outage or due to an issue with a local power supply. As another example, the technician may simply need to take a field device offline for troubleshooting in order to avoid negatively effecting other field devices and the rest of the process control system. The technician may also need to carry a multi-meter to measure the current, voltage, resistance, impedance, etc. available on a segment or loop, etc. Each of these tools can take up a fair amount of space, and may be inconvenient for a technician to carry in the field. To address this problem with carrying multiple tools, manufacturers have developed PTDs that include a power supply for providing power to a HART loop. Unfortunately, these powered PTDs are typically incapable of providing power to Fieldbus field devices. Further, typical portable power supplies and powered PTDs often fail to comply with Intrinsic Safety (IS) standards, and thus cannot be safely used in hazardous areas (e.g., environments or atmospheres that are potentially explosive due to the presence of explosive gas or dust).

Still further, if a field device is located in a hazardous area, the technician may need to verify that each of his or her tools operates in an intrinsically safe manner. Thus, when in a hazardous area, a technician's tools may need to comply with IS standards to ensure safe operation. Generally speaking, IS standards impose restrictions on electrical equipment and wiring in hazardous environments to ensure that the electrical equipment and wiring does not ignite an explosion. To comply with IS standards, electrical equipment generally needs to be designed with two core concepts in mind: energy limitation and fault tolerance. In any event, the requirement for IS compliance in some uses has led to the development of another set of field maintenance tools that may work with one of the field device protocols mentioned above, or others, but that is also IS compliant.

Likewise, as mentioned above, most process plants and other industrial settings (such as oil well drilling platforms, pumping stations, etc.) include other industrial equipment, such as rotating equipment, power generating or conversion equipment, vibration analyzer equipment, etc. that needs to be set up, configured, and maintained within the plant or industrial setting. A still further set of field maintenance tools may be needed to support this equipment, including configuring the equipment, testing the equipment, etc.

As a result, there are a host of various different types and brands of field maintenance tools that may be available for use in a process plant, in different sections of a plant, or in other industrial settings. Thus, to support the needs of maintaining and configuring the various different devices and loops within a plant or other industrial setting, a plant manager may purchase and store a plurality of (referred to also as a fleet of) portable maintenance tools to be used by plant or maintenance personnel. In some cases, these devices may be shared or checked-out by various different maintenance and other plant personnel at different times to be used as needed. In other cases, these portable devices may be assigned to persons, groups, etc. for use as needed. In any event, as these portable devices are becoming more sophisticated, they require more and more maintenance and support including, for example, more software upgrades, the provision of security features, such as the use and management of password protection features, etc. The maintenance and management of these portable devices can quickly become unwieldy and difficult because of the various number of portable devices that may be used within a plant, because the portable devices within a plant may be different types of devices or different brands of devices, because the portable devices may have different features which need different types of support, etc. Moreover, any particular portable device may be in use at any particular time, and thus may not be available for a support upgrade when such an upgrade is being performed, leading to the possibility of a particular portable device not being upgraded or receiving the latest software and firmware features.

SUMMARY

A fleet management system provides and implements an organized and automatic or semi-automatic methodology of managing a plurality of assets in a plant or other industrial setting, such as portable maintenance devices, stationary devices, etc., to assure that each of the assets receives or implements the content that it is supposed to have and is upgraded at the appropriate time to include new content, features, etc., while enabling a fleet administrator the ability to control the content that is provided to each of the portable or stationary assets in the fleet. Generally speaking, the fleet management system includes a centralized or common server system, such as an external cloud based server system or a server system disposed within a plant environment, that includes one or more memories for storing various information related to the fleet of portable or stationary devices including, for example, device identifications, device descriptions (model, serial number, etc.); end user names and privileges for the users of the fleet(s) of devices; current content of the devices, etc. The fleet management system also includes a content downloader module that obtains and stores content (such as software and firmware upgrades, additional features, applications, drivers, etc.) for delivery to and execution in the various ones of the fleet(s) of devices, a content decider module that analyzes when and if various members or units within the fleet of devices needs or should be provided additional or new content, and a notification system that notifies users of the devices or fleet managers that manage the devices of the need to upgrade or provide new content to the devices. The system may also include one or more fleet management stations disposed in or on various networks within a process plant or even in a cloud or offsite location to obtain notifications and content from the centralized system and provide that content to various ones of the portable or stationary devices within the plant via one or more network access points (such as wireless network access points) in the plant networks. The system may further include various portable devices, such as portable handheld units, that include wireless interfaces that wirelessly access the plant networks within the plant via one or more wireless network access points to receive content from the fleet management stations when appropriate.

As part of this fleet management system, the centralized server system may store and track the current configuration of each of the portable or stationary devices within the fleet of devices at all times. The centralized system may also download or obtain upgrades, software revisions, new features or functionality, or other new content from a software vendor, a manufacturer of the various portable or stationary devices within the one or more fleets of devices, business systems that purchase or acquire the new content, etc., as well as obtaining indications from the fleet management stations indicating which devices should receive which content. Thereafter, the centralized system may provide the appropriate new content to the various portable and/or stationary devices as configured or scheduled by the content decider by providing this content to the fleet management stations within the various networks of the plant or other industrial setting. As part of this process, the content decider may provide an authorization, such as a code or password, to the fleet management station to enable the downloading and use of new content on a particular portable or stationary device to assure that only that particular portable or stationary device gets the authorized content. When a portable or stationary device connects to the plant network and thus to one of the fleet management stations, the fleet management station may download the new or upgraded content to the device via a network access point, and may configure the device with the new content as appropriate. The portable or stationary device may acknowledge implementation of the new content to the fleet management station, which may notify the centralized server system of the successful upgrade or download of the new content. The centralized system may then mark the upgraded portable or stationary device as having the new content so that the centralized system stores the current configuration and state of each of the portable and stationary devices at all times.

Moreover, a user or fleet manager may use the fleet management stations to configure or instruct the centralized system to configure or specify which portable and/or stationary devices should have what content, (i.e., which devices are to have which upgraded features or upgraded software and firmware). This feature enables the devices within the fleet to be configured separately and differently, while still tracking which devices have which features and content in a manner that makes the configuration of the portable or stationary devices easy to manage. Moreover, the fleet management system may enable a fleet manager to restrict the use of certain portable and/or stationary devices within the fleet of devices to certain users, to certain areas of the plant or other industrial setting, to support certain types of plant or industrial equipment, devices, etc.

DETAILED DESCRIPTION

Figure 1:
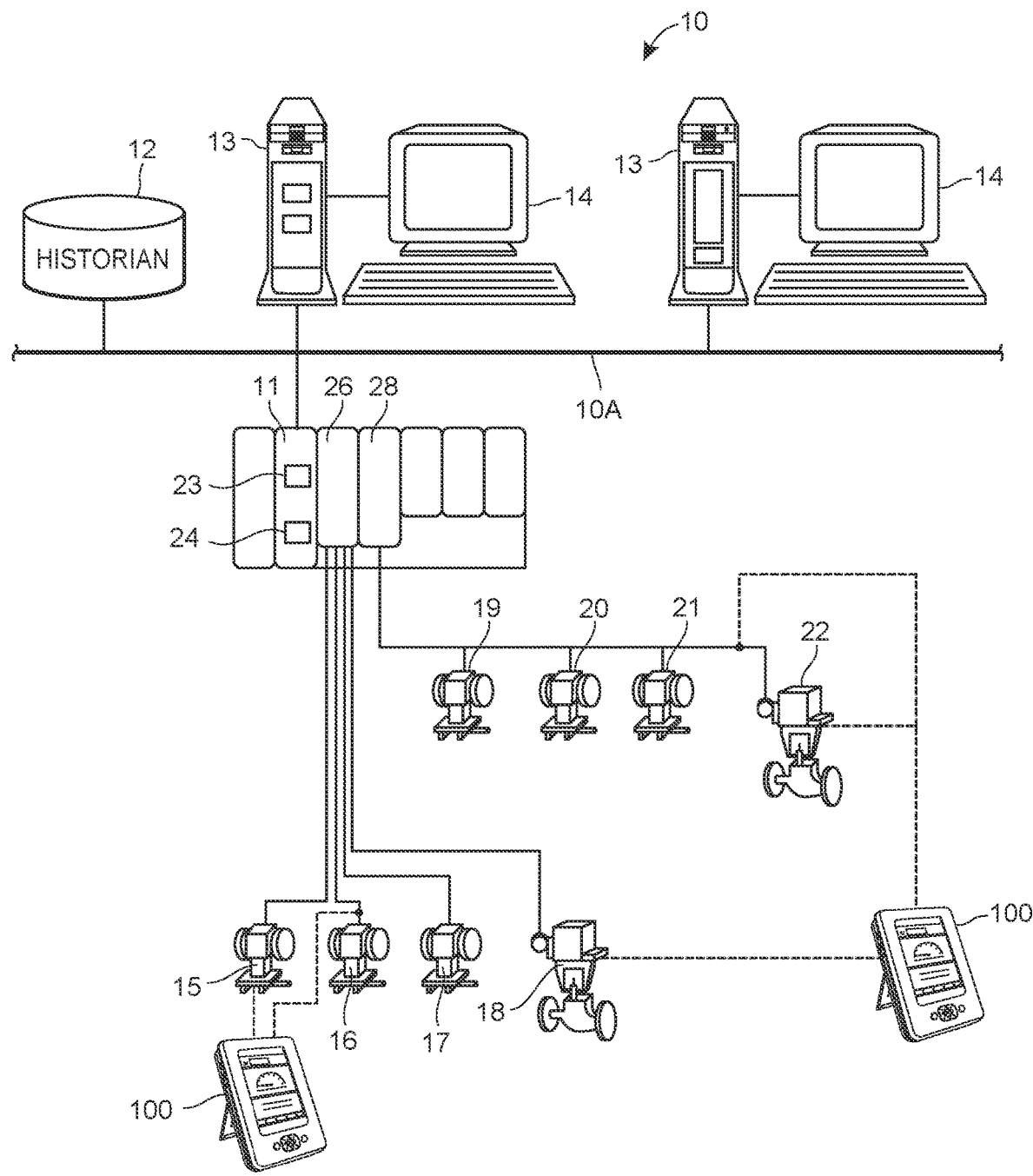
FIG. 1 is a block diagram of a control system within a process plant that may include use of industrial portable devices to be managed by a fleet management system.

FIG. 1 is a block and schematic diagram of an example process control network 10 of a process or plant control system, where the one or more handheld or portable tools, such as portable maintenance tools, may be utilized to install, configure, service, repair, diagnose, and otherwise support process control field devices, control loops, and other types of control devices within the plant. The process control network 10 is illustrated in FIG. 1 as including a first plant control network utilizing a wired communication network or link 10A with a process controller 11 connected to a data historian 12 and to one or more host workstations or computers 13 (which may be any type of personal computers, workstations, etc.), each having a display screen 14 as well as to various other input/output devices (not shown). The process control network 10 may include one or more sub-networks including a plurality of field devices illustrated in FIG. 1 as field devices 15-22, which may by any types of field devices used to control a plant or processes in a plant.

As illustrated in FIG. 1, the controller 11 is connected to the field devices 15-22 via input/output (I/O) cards 26 and 28 which may implement any desired process control communication protocol, such as one or more of the HART, Fieldbus, CAN, Profibus, etc., protocols. Moreover, the data historian 12 may be any desired type of data collection and storage unit having any desired type of memory and any desired or known software, hardware or firmware for storing data. The controller 11 is, in FIG. 1, communicatively connected to the field devices 15-22 to perform control of the field devices 15-22 and therefore control of the plant. Generally, the field devices 15-22 may be any types of devices, such as sensors, valves, transmitters, positioners, etc., while the I/O cards 26 and 28 may be any types of I/O devices conforming to any desired communication or controller protocol. For example, the field devices 15-22 and/or I/O cards 26 and 28 may be configured according to the HART protocol or to the Fieldbus protocol. The controller 11 includes a processor 23 that implements or oversees one or more process control routines (or any module, block, or sub-routine thereof) stored in a memory 24. Generally speaking, the controller 11 communicates with the devices 15-22, the host computers 13, and the data historian 12 to control a process in any desired manner. Moreover, the controller 11 implements a control strategy or scheme using what are commonly referred to as function blocks (not shown), wherein each function block is an object or other part (e.g., a subroutine) of an overall control routine that operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function that controls the operation of some device, such as a valve, to perform some physical function within the process control system 10. Of course, hybrid and other types of function blocks exist and may be utilized. The function blocks may be stored in and executed by the controller 11 or other devices.

Moreover, one or more portable or handheld tools 100, which may be field device maintenance tools, multi-meters, portable loop power supplies, field device configuration tools, etc., may be intermittently communicatively connected to one or more of the field devices 15-22 and/or to one or more of the buses or communication lines to which the field devices 15-22 are connected (e.g., a HART loop, a Fieldbus segment, etc.), with such connections being illustrated with dotted lines in FIG. 1. Such network connections may include the hardwired lines connecting one or more of the field devices 15-22 to the I/O cards 26 and 28, for example. Alternatively, the tools 100 may be communicatively connected directly to ones of the field devices 15-22 (e.g., via communication terminals present on the field devices 15-22). In some cases, the tools 100 may provide power to the field device 15-22 or to the wire loop to which it is connected. Moreover, the tools 100 may enable a user to communicate with, configure, perform maintenance activities on, and/or diagnose one or more of the field devices 15-22 when these field devices are installed in the plant. In still other cases, the tools 100 may include wireless interfaces that may be used to connect wirelessly to one or more of the field devices 15-22, such as a Bluetooth interface, a Wi-Fi interface, or a wireless process control protocol interface or connection, such as those that use the WirelessHART protocol. The portable maintenance tools 100 described herein are generally described for configuring, supporting, and maintaining field devices and are thus shown as field device communicators which may be used to, for example, support process measurement devices, such as pressure, temperature, level, flow analytical sensor, flow meters, valve positioners, etc. However, the tools 100 could be used to support, connect to, maintain, communicate with, or otherwise be used with other types of devices including, for example, rotating equipment, vibration detection and analysis equipment, power generating equipment, switches, motors, pumps, compressors, drives, mechanical vessels, such as tanks, pipes, etc., electrical power distribution devices, switch gear, motor control centers any other stand-alone equipment (e.g., equipment not communicatively connected to a process controller, for example), or any other types of industrial equipment. In these cases, the tools 100 could have various different types of communication and electrical generation and detection hardware (e.g., voltage, current, impedance, etc. generation and detection equipment) to perform maintenance on, configuration of, and/or communication with these other types of industrial equipment.

Figure 2:
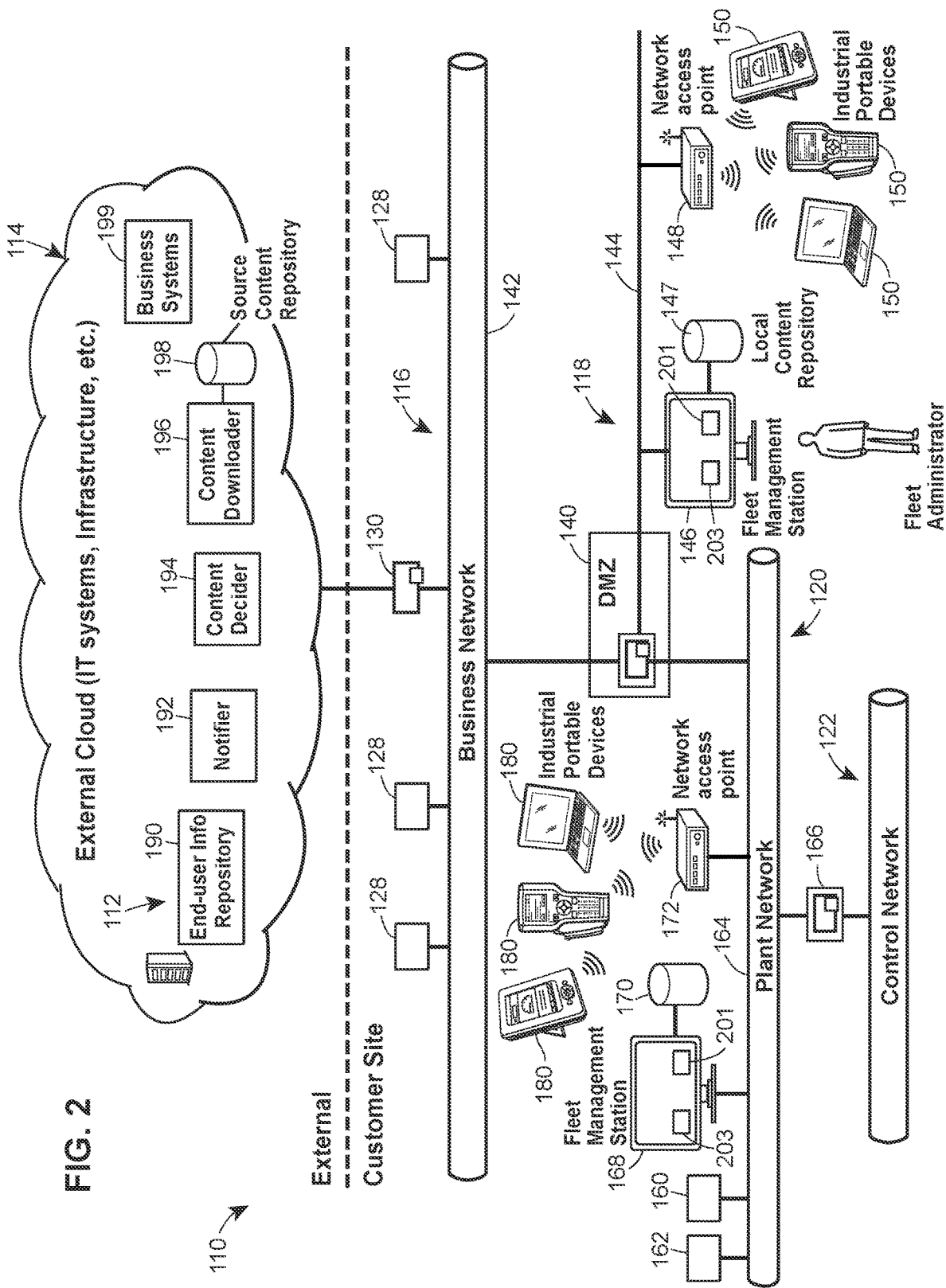
FIG. 2 is a block diagram of a fleet management system integrated within a process plant or other industrial environment in a distributed manner using a directly connected external fleet management server network.

FIG. 2 illustrates an expanded plant network and communication system 110 in which a fleet management system 112 may be used to manage one or more fleets of portable devices (such as the portable devices 100 of FIG. 1), or in some cases stationary devices, associated with or used in a plant environment or other industrial setting. The plant network and communication system 110 (or other industrial setting or environment) includes or is connected to an external server network 114 which may be located at an external (to the plant) site, such as in the cloud. The plant network and communication system 110 additionally includes a set of interconnected communication networks at the plant site (or at multiple plant sites or locations). In particular, the plant networks illustrated in FIG. 2 include a top level or business network 116, a plant administrative network 118, and a plant device network 120 which is connected to one or more control networks 122 (only one of which is illustrated in FIG. 2). As will be understood, the plant network 120 and the control network 122 may be the network 10 and sub-networks connected thereto for supporting the field devices 15-22 illustrated in FIG. 1.

As illustrated in FIG. 2, the business network 116 includes a set of business computers or workstations 128 which may implement business, accounting, planning, etc. applications, and this network 116 is connected to the external server system or network 114 via a firewall device 130. Likewise, the business network 116 is connected to the administrative network 118 and to the plant network 120 via a DMZ device or system 140 which acts as a network-to-network intermediary. Generally speaking the business network 116 includes several workstations 128 connected to a communication link 142 consistent with any suitable communication standard such as the IEEE 802.3 Ethernet standard, for example. As is typical, the workstations 128 share an operating system having networking capabilities such as, for example, Windows™ manufactured by the Microsoft Corporation. Users in various organizational roles operate the workstations 128 to carry out day-to-day activities within the plant, such as that of a plant operator, business systems that manage the plant, etc. For example, the plant operator may employ engineers, accountants, marketing staff, and other personnel. Users who operate the workstations 128 may have a certain set of permissions that typically do not permit these users to access the process plant network 120 or the process control network 122. On the other hand, these users have a mostly unrestricted access to hosts on the Internet and, as a result, a relatively high risk of exposure to viruses, malware, hijacking attempts, and other cyber threats.

Likewise, the administrative network 118 includes various computers or workstations connected via a communication link 144 consistent with any suitable communication standard such as the IEEE 802.3 Ethernet standard, for example. One or more of the workstations, illustrated as a workstation 146 in FIG. 2, operates as a fleet management station which includes or is connected to a local content repository 147 which stores local content for various of the portable devices in the plant. Likewise, the administrative network 118 may include one or more network access points 148 which may be wireless access points that enable one or more portable devices 150 (each having a wireless interface) to connect to the network 118 in a wireless manner, and thus to connect to the fleet management station 146 to upload and download content, as will be described in more detail herein.

In a similar manner, the plant network 120, which may be the network 10A of FIG. 1, includes various computers or workstations 160, data historians 162, etc. which are examples of stationary assets or devices connected via a communication link 164 consistent with any suitable communication standard such as the IEEE 802.3 Ethernet protocol, for example. The network 120 is connected via an access point 166, which may be a firewall or a control device, for example, to the process control network 122. Generally speaking, the workstations 160 may be operator workstations that enable process or control operators to view and control ongoing operations of the devices in the process control network 122 (such as controllers, field devices, etc.) to perform plant or on-line control operations. These workstations may include and execute various different applications that enable personnel such as operators and maintenance personnel to perform various analyses on control assets, such as field devices, and on other types of assets, such as rotating equipment, vibration equipment, power generation equipment, etc. As illustrated in FIG. 2, one or more of the workstations, illustrated as a workstation 168, operates as a fleet management station which includes or is connected to a local content repository 170 that stores local content for various ones of portable devices 180 in the plant. If desired, the fleet management station 168 may operate to manage and the local content repository 170 may store local content for various ones of the stationary devices as well or instead. Likewise, the plant network 120 may include one or more network access points 172 which may be wireless access points that enable one or more of the portable devices 180 (each having a wireless communication interface) to connect to the network 120 and thus to the fleet management station 168 to upload and download content, as will be described in more detail herein. The portable devices 150 and 180 may include multiple devices of the same type (e.g., field communicators, oscilloscopes, ammeters, etc.) and may include devices of different types as well as devices made by different manufacturers or devices having different capabilities.

As will be understood, the control network 122 may include various control devices and sub-networks, such as controllers, input/output (I/O) devices, and field devices connected via proprietary or process control networks such as HART, FOUNDATION Fieldbus, Profibus, CAN, etc. networks, and these sub-networks may use any desired process control protocol. Generally speaking, the portable devices 150 and 180 may be used to perform maintenance, checkout, repair, testing, calibration, and configuration activities on these devices and sub-networks. Likewise, the plant or other industrial setting may include other types of devices, such as vibration analysis and monitoring devices, rotating equipment, power generation equipment, etc. disposed therein that is not illustrated in FIG. 2 but that may be serviced, maintained, installed, repaired, tested, calibrated, etc. using one or more portable devices 150 and 180.

The DMZ layer or device 140 operates to separate the process control layers or networks 120 and 122 as well as the plant or industrial setting device networks, and the administrative network 118 from the internet or other external networks or public networks, such as the business LAN network 116 and the external network 114. In the example communication system 110 of FIG. 2, the plant LAN layer or business network 116 is connected to the internet or other public network via a router/firewall 130, and the plant DMZ layer 140 is connected to the plant LAN layer or business network 116 via a router/firewall as part of the DMZ 140.

The plant DMZ 140 may include several servers such as an anti-virus server, a data server, and a historian server. As is known, a DMZ layer 140 generally provides additional security to a local or plant networks, such as the networks 118, 120, and 122, by limiting direct exposure to a larger network such as the internet to only several hosts (i.e., the anti-virus server, data server and historian server, a DNS server, a web server, etc.). It will be noted that the DMZ layer or device 140 in general may be any intermediate network layer that improves the security of the systems 118, 120, and 122 by directing all incoming and outgoing internet traffic via one or several hosts that implement security features to make the communications secured.

Moreover, the fleet management system 112 of FIG. 2 includes various components that may be located in different ones of the networks of FIG. 2. In particular, the fleet management system 112 includes the portable devices 150 and 180 as used within the plant networks or other industrial networks 118, 120, and 122, for example, the fleet management stations 146 and 168 and the associated local content repositories 147 and 170, respectively, as well as various components in the external or cloud based network 114 including an end-user repository 190, a notifier 192, a content decider 194, and a content downloader 196 which generally operate together to determine the content that needs to be downloaded to various ones of the portable devices 150 and 180. The fleet management system 112 may also be connected to and receive information from one or more business systems or computers 199 illustrated in this case as being in the external or cloud based network 114. The business systems 199 may be used to purchase or acquire new content for one or more of the portable devices 150 and 180, and may provide indications of such a purchase or license to the fleet management system 112 in the form of license keys, codes, etc. Likewise, the various firewall and DMZ devices 130 and 140 include programming or configurations associated with the fleet management system 112 that enable secure communications between the fleet management stations 146 and 168 and the fleet management components in the external network 114. Still further, the fleet management stations 146 and 168 include communications software that enable these devices to navigate the DMZ and firewall devices 130 and 140 to communicate through these devices in a secured manner to the external network 114.

More specifically, the industrial portable devices 150 and 180 may include field communicators, calibrators, and other types of portable devices, that are used in industrial settings such as industrial plants, process plants, oil wells, pumping stations, etc., to configure, troubleshoot, calibrate, and perform other operations on field devices such as process measurement devices, valves, positioners, etc. as well as other types of devices or assets used in industrial settings, such as rotating equipment (turbines for example), power generation equipment, vibration analysis and detection equipment, etc. Of course, different types and brands of industrial portable devices may be manufactured by the same or different manufacturers, and various ones of the industrial portable devices 150 and 180 may have different features and capabilities. For example, some of the industrial portable devices 150 and 180 may be field communicators that communicate on one or more of the various sub-networks 122 in the plant to communicate with field devices such as HART or Fieldbus field devices. Some of the industrial portable devices 150 and 180 may be calibrators or configurators that calibrate or configure devices in the plant, including field devices and other types of devices, such as rotating equipment, vibration analyzers, etc. Still further, some of the industrial portable devices 150 and 180 may be or may include electrical testing functionality, such as ammeters, voltmeters, resistance meters, impedance meters, or multi-meters used to test wiring and other devices in the plant, such as power supplies. Likewise, some of the industrial portable devices 150 and 180 may be intrinsically safe and thus able to be used in hazardous environments. Some of the industrial portable devices 150 and 180 may be specially configured portable devices made by various manufacturers, or may be implemented as software features or hardware implemented on or connected to a general purpose computer, such as a laptop, a phone, a personal digital assistant (PDA), a tablet computer, etc. The portable devices 150 and 180 may be grouped into one or more fleets of portable devices in any manner using, for example, one of the fleet management stations 146, 168, based on, for example, functionality, use, type, manufacturer, users, etc., or any combination of these and other characteristics.

Additionally, the feet management stations 146 and 168 are computers or workstations having processors that execute associated fleet management software 203 that are, in this example, located at the end user's site or in the plant. These devices are used as the user interface by a plant or fleet administrator, for example, to manage each of the identified fleets of industrial portable devices in the plant. More particularly, these computers are used by the portable (or stationary) device fleet administrator to perform some or all of the activities described later in conjunction with automatically and semi-automatically managing the content within the fleets of industrial portable devices 150 and 180 as well as fleets of stationary devices if so desired. Likewise, the local content repositories 147 and 170 are databases that locally store content for the portable devices 150 and 180 (as well as for stationary devices if desired) at the end-user's site prior to or after that content has been downloaded to the various portable devices 150 and 180 or stationary devices.

Still further, the internal communication networks at the end user's site, e.g., the plant, typically include multiple, isolated networks, including business networks 116, plant networks 120, control networks 122, etc., and a network-to-network intermediary or DMZ device 140 executes software that runs on top of the existing routers in the plant to interconnect these networks. In one example, the DMZ software implements port re-direction which retains network isolation, but allows the computers or industrial devices on a plant networks 118, 120 to gain secure access to external networks including the external cloud network 114. As used herein, the networks 116, 118, 120, and 122 and the devices connected thereto may be considered to be all at the same general location referred to as a first or a second location, or these networks and devices may be considered to be at different locations.

However, in at least one embodiment such as that illustrated in FIG. 2, the fleet management system 112 includes components in an external cloud or server system (IT systems, infrastructure, etc.) that is external to the plant networks. This external network includes the content decider 194 which is a software mechanism that generally runs on IT infrastructure (servers, processors, etc.) in the external cloud to evaluate a number of different input criteria, and to determine what filtered/targeted content a particular industrial portable device (or content that a particular stationary device) at a particular customer site is entitled to have or use. Generally speaking, the content decider 194 stores or receives inputs detailing the features, programming, operating systems, upgrades, etc. (all of which is referred to as content), and configuration information indicating configuration parameters for the industrial portable devices 150, 180 or stationary devices, and determines what content each industrial device in the fleet of industrial portable devices or stationary devices is allowed to have. Moreover, the content downloader 196 is coupled to the content decider 194 and provides efficient, secure connections for downloading content to the industrial devices, as specified by the content decider 194, via the external and internal networks of the plant in which the industrial portable device or stationary device is used or located.

Still further, the source content repository 198 stores all content available for download to the industrial portable devices 150 and 180 (or stationary devices if so desired) and provides that content to the content downloader 196 when needed to be downloaded to the industrial portable devices 150 and 180 (or stationary devices) in the plant. The notifier 192 is a module (e.g., software executed on a processor) that sends notifications to users when content becomes available for or is determined to be downloadable to particular industrial devices, such as when the content decider 194 determines that new content has been obtained (e.g., licensed or purchased) using one of the business systems computers 199. Generally speaking, the business systems computers 199 include user account and authentication, purchasing, order management systems, an application or feature store, etc., that may be used to acquire new content. Finally, the end user information repository 190 is a database and communication module that gathers and stores end-user information regarding or detailing the current list of content and versions of such content on each industrial portable device in the fleet of industrial portable devices 150 and 180 and/or on each a set of stationary devices in a fleet of stationary devices in a plant or other industrial setting.

It should be noted that the components of the fleet management system 112 disposed in the external cloud network 114 could be used to support various different fleets of portable and/or stationary devices either in the same or in different plants. That is, the fleet management components 190-199 of FIG. 2 could be configured to store and obtain information about, and make downloading decisions for, multiple different fleets of industrial portable devices, with each fleet being associated with the same or a different plant. Moreover, in some cases, the fleet management system components 190-199 may be associated with or provided by a vendor and may be leased or used by different plants (on a subscription basis, for example) to support different fleets of portable devices in different plants owned or operated by different users. The devices or components 190-199 are illustrated in FIG. 2 as being part of an external network 114 and are thus remote from or at a different location than the devices in the networks 116, 118, 120, and 122. However, while the devices 190-199 may be part of different cloud or remote networks that are physically separated from one another in actual implementation, these devices may be referred to herein as all being at a single location or on a single network, such as at a first or at a second location, which is done to indicate that these devices are at a different location or a location distributed from the location of the assets of the plant or industrial setting in which the devices 150, 180 are located. Thus, the devices 190-199 can be physically remote from one another and can be connected on different remote networks and still be considered to be at a single location or on a single network, as those terms are used herein.

Generally speaking, the fleet management system operates 112 at two levels, with basic control and general optimization of the portable or stationary device content being performed by or specified by plant administrators using the fleet management stations 146 and 168 in the plant at which the fleet of portable or stationary devices is located, but with decisions regarding downloading content and the notifications of which specific content should be provided to which portable or stationary device in a plant, and with portable or stationary device content tracking being performed by devices or modules in the external network 114.

More particularly, the fleet administrators first connect with the various portable (and/or stationary) devices in the fleet via the network access points 148, 172 or via the communication networks in the plant or other industrial setting, and collect data from the portable and/or stationary devices defining or identifying the content, manufacturer, capabilities, etc., of each of the portable or stationary devices in the fleet of portable or stationary devices. Of course, such content can be entered into the fleet management system 112 via the fleet management stations 146, 168 in a manual manner. This content information is the sent up to the external network 114 and is acquired by and stored in the end-user information repository 190 via the DMZ 140 and the firewall 130.

The repository 190 stores indications of the current content of each of the industrial portable devices 150 and 180 in each of the identified fleets of devices and/or of each of the fleets of stationary devices in a fleet of stationary devices. More particularly, the repository 190 stores information regarding the identity of each portable (or stationary) device in each fleet of devices being managed, such as the make, the model number, the manufacturer, the revision number, and may also store indications of use restrictions, capabilities, software and firmware stored on the portable device (including applications, device drivers, etc.), the updates or upgrades that have been applied, configuration settings that have been made or applied, etc. Thus, the repository 190 stores indications of the current content of each of the industrial portable or stationary devices within each fleet of industrial portable or stationary devices used in a plant or other industrial setting, as provided by the device itself or the fleet management station 146, 168 used to manage that device. The repository 190 may periodically poll for this information, or this information may be sent by the fleet management stations 146, 168 periodically, or when new information is obtained from portable devices 150, 180 or from stationary devices, when the fleet administrator wishes to send that information, or in any other manner.

Moreover, if desired, the user device repository 190 may receive configuration information from one or more of the fleet management stations 146, 168 indicating which of the portable devices and/or stationary devices are associated with which fleets and may receive forms or other configuration information filled out or provided by a fleet manager indicating sub-divisions or categories of portable and/or stationary devices within a fleet of devices being managed. For example, a fleet manager may specify a configuration level or group of a portable or stationary device for one or more of the portable or stationary devices in the fleet (e.g., a level 1 or a level 2 device) with each level of device having different configuration parameters and being treated differently with respect to allowable content. In another case, the fleet manager may specify use or user restrictions on various ones of the devices in the fleet of devices, which restrictions indicate which devices can be used by which users or groups of users, which devices can be used in which areas of a plant or to service which devices, networks, etc. within a plant or other industrial setting, etc. In some cases, the fleet manager for a plant or a fleet of portable or stationary devices may fill out forms (at the fleet management workstations 146, 168, for example) which indicate categories, use or content restrictions for various devices in the fleet, etc., and these forms or information may be stored in the end user device information repository 190.

During operation of the fleet management system 112, the content decider 194, which is connected to the business systems computers or networks 199, may periodically, on demand, or at other times, review all of the information from the business systems (indicating new content that is available for or authorized) for a particular industrial portable or stationary device and compare that content to that which is actually stored in the portable or stationary device, as indicated by the repository 190. When new content is available for a particular industrial portable or stationary device, and the content is allowed to be provided to the portable or stationary device as specified by or as indicated by the configuration forms or configuration information for that device as stored in the repository 190, the content decider 194 may initiate a message to the notifier 192 which sends a message or notification that new content is available and/or is authorized for a particular portable or stationary industrial device. This message or notification may be sent via the various networks 116, 118, and 120 and the various firewalls or intermediaries 130 and 140 to the fleet management stations 146 and 168, or may be sent in other manners using other networks, such as via e-mail, via text message, via fax, etc. Likewise, the content downloader 196, upon a request by one of the fleet management stations 146 and/or 168, may obtain the new content from the repository 198 and download that content to one or more of the fleet management stations 146 and 168, which may store that content in the local repositories 147 and/or 170. Then, when the portable or stationary device for which new content is available connects to one of the fleet management stations 146, 168 via a network access point 148, 172 for example or via some other network connection in the appropriate network 118, 120, the fleet management station 146, 168 may download the new content to the portable device 150, 180 or to the stationary device to thereby update or upgrade the portable or stationary device. This fleet management station 146, 168 may also notify the repository 190 of the download so that the repository 190 indicates the new content is now within or part of the industrial portable device 150, 180 or within a stationary device. Of course, the administrator of the fleet management system 112 may be able to set up the procedure of obtaining and downloading new content, based on newly available content as determined by the content decider 194, in an automatic manner, a semi-automatic manner, or a manual manner. That is, the updating and downloading of content may be performed automatically whenever, for example, an industrial portable or stationary device connects to one of the plant networks 118, 120 so that new content is provided to the device as determined by the content decider 194 automatically. Likewise, this updating may be performed semi-automatically by the fleet management system 112 checking for new content for a connected industrial portable device 150, 180 or a stationary device, and notifying the administrator via one of the fleet management stations 146, 168, for example, that new content is available to download to the portable device. The administrator may then authorize the download at one of the fleet management stations 146, 168 and the download may occur. In another scenario, the administrator may manually run a check for new content for a particular portable or stationary device and allow or authorize a download in the event that new content is available.

Still further, as indicated above, the fleet management administrator may set up or configure forms that indicate what content to download automatically, semi-automatically, manually, or not at all, thus providing the fleet administrator with the ability to control what content goes to which portable or stationary devices and the manner of downloading this content. Likewise, there may be situations in which one of the business systems purchases a set of licenses for new content, but not enough licenses for all of the portable or stationary industrial devices. In this case, the fleet administrator can use configuration modules 201 within, for example, the fleet management stations 146 and 168, to generate configuration forms, which may enable the user to indicate which portable or stationary devices should get the new licensed content and which should not. This configuration information can be sent to the repository 190 and used by the content decider 194 to determine which portable devices can have the new downloadable content.

Generally speaking, the content decider module 194 provides the fleet management system 112 with the ability to filter and target content to individual end-user industrial devices based a number of different criteria, including based on new content becoming available via purchase, license, or other acquisition, updated or upgraded content becoming available at the source content repository 198, a change or implementation of new configuration information regarding the fleet of devices, the acquisition of a new industrial portable or stationary devices within the fleet, the changing of individual device configuration parameters such as assigning portable or stationary devices to new classes or levels of content, assigning portable or stationary devices for new or different uses in a plant, assigning portable or stationary devices with new security features, or with security features that enable use of a device by more or less people or groups of people, in more or less areas of a plant, with more or less field devices or networks or other types of devices, etc. (all as expressed or configured in configuration templates created using the configuration modules 201). Moreover, the fleet management system 112 is able to securely extract customer system information from industrial portable or stationary devices and provide that information to the external cloud network 114, to be used to provide additional value to those end-users. Moreover, the content decider 194 provides the ability or functionality to filter, target, and download content to appropriate industrial portable or stationary devices based on a diverse set of criteria, and provide direction regarding what content is to be downloaded to a particular customer or plant site and what content is to be installed on particular industrial portable or stationary devices at that site. Moreover, the content decider 194 performs this evaluation and decision making at a centralized place or location to allow access from multiple places at a particular customer site, as well as from multiple different customer sites.

As will be understood from the discussion above, the content decider 194 is a software mechanism that runs or executes on IT infrastructure (processors and memories) in the cloud network 114 (but could instead run on a local computer in the plant) to evaluate a number of different input criteria, and determine what filtered/targeted content a particular industrial portable or stationary device at a particular plant or customer site is entitled to receive. The content decider 194 may use, as input criteria, a complete list of available content, versions, and associated information, device IDs or other identification information of each of the particular industrial devices, information regarding the content and version of this content that is currently installed on each of industrial portable and/or stationary devices in a fleet, service contract information for each of the industrial portable or stationary devices in the fleet (e.g., if each of the devices is properly licensed for a particular use, or for particular content), the assigned user or users of the industrial portable or stationary devices (which users may be defined as authorized groups of users, types of users, specific users, indications of external versus internal users that may use the device, the company or organization of one or more users, etc.), the configuration information provided in the form of templates, for example, identifying the level or nature of content that each particular industrial portable or stationary device is to receive, a class of each portable or stationary device (and thus the class of appropriate content) for each of the devices, etc. Outputs from the content decider 194 include, but are not limited to a list of content items, versions, and other associated information available for one or more industrial portable or stationary devices, referred to as content entitlements, and notifications to the user or fleet manager associated with an industrial portable or stationary devices that new/updated content is available.

The content decider 194 may be implemented at any time, such as on demand, periodically, when an event occurs, such as new content is added to the content repository 198, etc., to determine if new or different content is to be applied to or downloaded to a particular industrial portable or stationary device. Generally speaking, the content decider 194 may perform an evaluation whenever there is a status change that potentially affects one or more industrial portable or stationary devices. Such a status change may be the result of new, upgraded, or changed content being provided to the content repository 198, a notification from, for example, a business system computer 199 that a license or purchase or acquisition of new content has been made or that additional licenses for old content have been obtained, e.g., that a new order has been processed for content that is purchased for a particular industrial portable device or for a set of such devices, that a new service contract has been initiated, that a service contract has expired, whenever one of the fleet management stations 146, 168 makes or provides a change to one of the configuration templates for one or more of the industrial portable or stationary devices, etc. When implemented, the content decider module 194 evaluates the inputs described previously, determines what new content and versions each of the particular industrial portable or stationary devices is entitled to receive, and provides a list of such content and versions back to the fleet management station 146, 168 for download to the device(s).

In an example scenario, an industrial portable device administrator at a customer or plant site may perform fleet management activities on a number of industrial portable devices 150, 180, either from a fleet management station 146, 168 in the plant or directly from an industrial portable device 150, 180. The fleet manager may make a request to the external cloud network 114 for a list of any content updates that are available for these particular industrial portable device(s). The external cloud network 114 engages the content decider module 194 to determine what updates, new content, etc. is available for the particular industrial portable device(s). The content decider 194 then gathers a number of inputs, including information regarding content that is currently installed on each of the industrial portable devices from the repository 190, content that is stored in the source content repository 198, service contracts associated with the industrial portable device, configuration information for the industrial portable device(s) as provided by the fleet manager or the devices themselves, etc. Next, the content decider 194 builds a response containing a list of content and versions to which the particular industrial portable device(s) are entitled but do not yet have based on this information. Thereafter, the content decider module 194 returns the response to the application indicating the new or different content for the industrial portable device(s). This process may be repeated for each of the different industrial portable device(s) in the fleet.

As will be understood, this mechanism enables the fleet management system 112 to tailor content to specific industrial portable devices 150, 180 (or to stationary devices) and to assure that that the appropriate content is downloaded to the portable or stationary devices, and that only that content is downloaded to the portable devices. Moreover, this mechanism gathers the diverse inputs from diverse sources, performs an evaluation, and then returns a list of entitled content and versions for a particular industrial portable or stationary device.

As will be understood, the fleet management 112 system described herein enables industrial portable devices, such as field communicators, calibrators, etc., that are used in industrial settings (such as in industrial plants), to configure, troubleshoot, calibrate, and perform other operations on field devices such as process measurement devices, valves, positioners, etc., as well as other types of devices or assets, to be maintained and kept up-to-date in an organized and easily verified manner, including managing updates to software, drivers, etc. Additionally, the fleet management system 112 enables more customization and efficiency when configuring different industrial portable and stationary devices within a fleet, which is desirable as industrial portable and stationary devices are becoming more complex, with more capabilities, software applications, functionality, etc.

Likewise, the fleet management system 112 enables users who often own multiple or many industrial portable or stationary devices to easily manage these fleets of devices. In particular, the fleet management system 112 provides end-user effectiveness and efficiency by enabling the end-user to update content on industrial portable and stationary devices in an easy and organized manner to ensure that the industrial portable and stationary devices are running with the latest software, drivers, other content, etc. This system also enables the users to limit the content on an industrial portable and stationary device to only what the user needs or wants. Extra software, field device drivers, and other content just add clutter onto an industrial portable or stationary device, and make it more difficult to use the device. As a result, the fleet management system 112 is advantageous for user efficiency as it enables a fleet manager to provide or specify a targeted set of frequently-used content, such as applications and drivers, onto all or some of a fleet of industrial devices. Likewise, it enables a user to customize one or more of the industrial portable or stationary devices for different classes of users, for different individual users, for different classes or types of uses, etc.

Additionally, the fleet management system 112 provides administrator efficiency as it enables an administrator to be able to create, set up, and reuse configuration templates that define basic and various higher levels of industrial portable (or stationary) device setup and configuration parameters on multiple devices. That is, the administrator can use one of the configuration modules 201 (which execute on processors of the fleet management stations 146, 168 for example) to create a template defining the content to be placed on a portable or stationary device, to thereby create a particular type or level of device for use in the plant or other industrial setting. This template can then be used to configure a set of two or more the fleet of industrial portable or stationary devices at that level. Other templates can be created or set up to create higher or different levels or types of devices with more or different content. The administrator can simply change the configuration template to vary the content of all of the devices using that template, upload that new configuration template to the user device information repository 190, and the fleet management system 112 will automatically determine that new content is available for the devices applicable to or covered by the updated template and download the new content, as defined by the updated template. This process can work in reverse by having features or content removed from the template, in which case the fleet management system 112 may remove or uninstall software, features, or other content from the industrial portable or stationary devices using this configuration template. In any event, this template based configuration enables the administrator to automatically configure a fleet of devices to be the same or different using various templates.

Still further, the fleet management system and, in particular, the content decider 194, can automatically remove content from one or more industrial portable or stationary devices when, for example, a particular license for that content or for applications associated with that content expire, when a service contract for the industrial portable or stationary device expires, etc. In this case, the content decider 194 will recognize, based on the provided inputs, that a particular device has too much content or has non-authorized content based on the updated license information, and the content decider 194 may initiate a message to the fleet management station that is managing the device to remove the content that is no longer authorized or allowed.

In still other cases, the fleet management system 112 may be used to automatically restore or reconfigure a particular device within the fleet of devices when a device is reset, wiped clean, or otherwise suffers a catastrophic memory failure, for example. Here, the content repository 198 may store configuration information for the portable or stationary devices within the fleets of devices being managed or serviced. Such configuration information may include device and application settings including, for example, operating system settings, particular application settings, security settings, user interface settings, peripheral device connection settings, etc. As such, it will be understood that the source content repository 198 may store both user generated content (e.g., content generated or developed by the users of the devices in the fleet of devices and sent to the fleet management system 112) as well as third party content (e.g., content developed by and/or provided by third parties, such as device manufacturers, application providers, etc.) to be downloaded to devices in the fleet of devices. In any event, when a device within the fleet of devices suffers a memory failure, is reset, is upgraded, is serviced in a manner that deletes content, etc., the device will, at some point after coming on-line, notify the fleet management station servicing that device of the new content (or reduced in set content) currently on the device. Of course, the fleet management station may poll the device for this information. The fleet management station may then provide that new list of content to the end user information repository 190 which then stores this information. Next, when the content decider 194 operates to determine if new content is available for that device, the content decider 194 will determine that the content that was deleted in the failure or service operation is available to be downloaded and will cause that content to be downloaded to the device in the manner described above. As part of this process, the content decider 194 may recognize that the configuration content for the device, as now stored in the content repository 198 is different than the current configuration of the device as provided to the end-user information repository 190, and may provide the stored configuration information as stored in the content repository 198 to the device as part of the download. In this manner, the device will be restored to its former content and configuration condition prior to the failure, making recovery of the device much easier and less time consuming.

Still further, the fleet management system 112 provides for a high level of administrator control so that the device or plant owner has the ability to define the level of flexibility versus portable device configuration consistency versus portable device control that is allowed or used in configuring the industrial portable and stationary devices within the plant or other industrial setting. The fleet management system 112 also enables the enforcement of security in the configuration and use of industrial portable and stationary devices, as the industrial portable devices 150, 180 and stationary devices can only be changed or altered via the fleet management stations 146, 168 which are secured and which have secure access to new content to be downloaded to the industrial portable devices 150, 180 and stationary devices. Likewise, the fleet management system 112 enables an administrator to set use-privileges on a portable or stationary device by portable or stationary device or other basis and to maintain these privileges using configuration templates and other configuration data stored in the user device information repository 190. Thus, the administrator may configure individual portable or stationary devices to be used by only certain personnel (e.g., user and passwords), in certain areas or locations of the plant, for certain uses (e.g., only in non-hazardous environments), or any combination thereof. Moreover, because the fleet management system 112 described herein manages all content on the portable and/or stationary devices (including limiting what is put onto a portable or stationary device as well as what is taken off of the portable or stationary device), the fleet management system 112 conserves limited memory and resources on industrial portable and stationary devices.

It will be understood that industrial portable device "content" as used herein is defined to include any software items that are deployed on an industrial portable device, which can include, but is not limited to (1) software applications, (2) field device drivers, such as device descriptors (DDs), (3) device packages, and other drivers, such as drivers for other types of devices to which the industrial portable device can connect in a wired or wireless manner, (4) user assistance artifacts, including user manuals, online help, instructional videos, etc., (5) technical support artifacts, including knowledge base articles, support write-ups, etc., (6) upgraded functionality such as new software or firmware features, etc., and (7) industrial portable or stationary device configuration information. Thus, as described above, content can include third party content, such as that provided by a device manufacturer, an application provider, an application or device licensor or servicer, etc., and can include user generated content, such as configuration content like device, operating system, application, device driver, security, etc. settings and information as generated by a user or fleet manager that uses or manages the device.

Thus, general speaking, the fleet management system 112 for industrial portable devices described herein includes uploading content or descriptions of content from the industrial portable or stationary devices to a centralized storage and configuration system or repository, downloading new content to the industrial or stationary portable devices from a centralized server system that manages content on the industrial portable or stationary devices, and controlling the content, security, user experience, etc. for each industrial portable or stationary device in the fleet using one or more fleet management stations under the control of the plant operator or user. There are, of course, a number of different potential deployments of the fleet management system 112 described herein, and the primary capabilities provided by this solution include (1) the ability to provide content updates securely all the way from a source, such as an IT or external cloud infrastructure external to the end-user's internal networks, to industrial portable or stationary devices on the end-user's internal networks, including the plant networks and other industrial setting networks, (2) the ability to securely extract customer system information from industrial portable or stationary devices on the plant network and provide that information to fleet management devices or modules in the external cloud network, and (3) the ability to control what content does and does not get installed on industrial portable and stationary devices in the fleet (by targeting content to specific industrial portable and stationary devices in the fleet). This control may be accommodated or provided via licensing, via download control through service contract enforcement, and via end user customizations, for example, by allowing the administrator or industrial portable or stationary device end-users to use templates or configuration forms that can be applied across multiple industrial portable or stationary devices or units, that provide customization of individual units, and that provide administrator and end user privilege customization.

Still further this system provides security management by providing, enforcing, and controlling user authentication/login procedures on individual industrial portable and stationary devices, and by providing user authorization and field device access to control access to field devices or other types of plant or industrial devices from industrial portable service devices and stationary devices. Likewise, the solution is secure through different plant network levels by providing for network isolation between an external network, a customer office network, and a customer plant network, with the ability to securely communicate and transfer messages and files between those different isolated networks, by providing content integrity implemented through encryption, content signing, etc., and by communication pipe integrity.

As an example of a particular use, the fleet management system 112 described herein can operate to update one or more industrial portable devices with targeted content, after a customer purchases the new content. In this case, referring to FIG. 2, the customer (or plant owner or administrator) orders new content, via the business systems computer 199, for example, in the external cloud network 114. When the purchase (or license or other acquisition) of content is complete, the business systems computer 199 notifies the content decider module 194 of the new order or the available content for one or more of the industrial portable devices 150 and 180. The content decider module 194 then gathers (1) a complete list of available content and versions for the content from the source content repository 198 via, for example, the content downloader module 196, (2) a complete list of current content and versions on one or more of the industrial portable devices 150 and 180 from the end-user device information repository 190 as well as the configuration templates for these devices, (3) the service contract information from the business systems computer 199, (4) one or more device IDs for the particular industrial portable devices for which the content was purchased (if provided or specified) from the business systems computer 199, and (5) current configuration information for the devices as stored in the source content repository 198, if needed. The content decider module 194 then makes an evaluation for one or more of the industrial portable devices to determine if that new content is available for each of the particular industrial portable devices (with the particular device IDs if provided) and if allowed by the configuration templates and current configuration information or settings, and alerts the notifier module 192 when one or more industrial portable devices can have new content. The notifier module 192 then sends a notification via e-mail, text message, or some other electronic notification method, to the fleet administrator at one of the fleet management stations 146 and 168 via secured inter-network communications, for example, indicating that there is new content available for download for one or more of the industrial portable devices 150, 180.

Next, using one of the fleet management stations 146, 168, the customer administrator may initiate a "check-for-updates" request to the external cloud network 114, which receives the check-for-updates request and routes the request to the content decider 194. The content decider 194 gathers a complete list of available content and versions from the source content repository 198, a complete list of current content and versions on the particular industrial portable device from the end-user device information repository 190, the service contract information from the business systems computer 199 and the device ID for the particular industrial portable devices from the business systems computer 199 and again may make an evaluation as to new content to be provided to one or more industrial portable devices. The decider module 194 then sends the list of targeted content and versions that each of the particular industrial portable devices is entitled to receive back to the fleet management station 146, 168.

At the fleet management stations 146, 168, the customer administrator initiates the content download from the source content repository 198 within the external cloud network 114 using secured communications via the various site networks and the firewall 130 and the DMZ 140. The new content is then downloaded and placed in the local content repository 147, 170. Next, when the particular industrial portable device is connected to the appropriate fleet management station 146, 168 via a wireless network connection device or access point 148, 172, the fleet administrator initiates the installation of that content onto that industrial portable device from the local content repository 147, 170. Once the content has been installed in the particular industrial portable device, the fleet management station 146, 168 reports back to the external cloud network 114, and in particular to the end-user device information repository 190, that the content has been installed to this particular industrial portable device. The end-user device information repository 190 then updates the file or record for that industrial portable device as including the new content and the source content repository 198 may store an updated set of configuration information for the device if configuration settings, etc. have changed. Of course, the fleet management system 112 may operate in the same manner to remove content from the industrial portable device or to both remove and install content, as needed.

In another scenario, the fleet management system 112 may update one or more industrial portable devices 150, 180 with targeted content, after a new content version has been made available to, for example, the source content repository 198. In this case, the new version of a particular content item, such as a software application, is added to the source content repository 198 in the external cloud network 114. The source content repository 198 then notifies the content decider 194 of the new content item version and the content decider 194 performs all of the tasks described above to determine which, if any, of the industrial portable devices should receive that new content. Thereafter, the system 112 provides the new content item version to one or more industrial portable devices in the manner described above.

Figure 3:
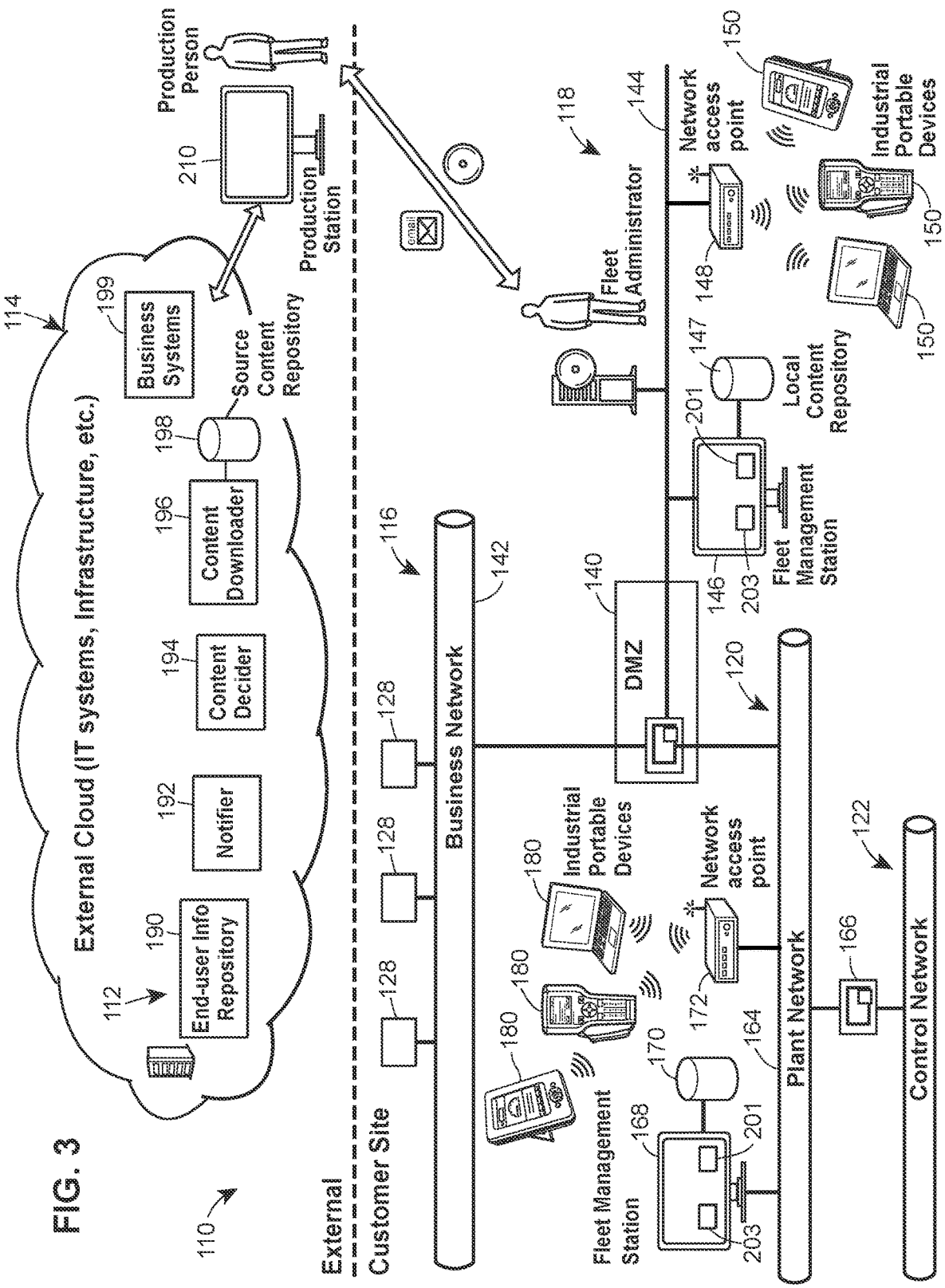
FIG. 3 is a block diagram of a fleet management system integrated within a process plant or other industrial environment in a distributed manner using an indirectly connected external fleet management server network.

In another example embodiment, the fleet management system 112 may be configured to eliminate, for security purposes for example, the network connection between an end-user's business network or plant LAN 116 and the external cloud network 114. In this case, the fleet management system 112 may be configured as illustrated in FIG. 3, in which like elements have the same reference numbers as in FIG. 2. As will be noted, however, the system 112 of FIG. 3 requires a manual flow of information and content between the external network or system 114 and the plant or end-user site, as the firewall 130 and connection between the network 114 and 116 is eliminated. Instead, a production station 210 is connected to the network 114 which may receive content to be downloaded and notifications of downloads or changes to the content in particular portable or stationary devices. The production station 210 may be used to store that content and information on a hard drive, a flash drive, a CD, or some other external or portable storage medium in a secure formant to be provided manually to one of the fleet management stations 146, 168 via an external drive mechanism.

Thus, in one scenario, using the fleet management system 112 of FIG. 3, an industrial portable device 150, 180 or a stationary device may be updated with targeted content after a user purchases new content in a disconnected deployment environment. Here, the customer orders new content, via an external business systems computer 199, for example, in the external cloud network 114. The business systems computer 199 notifies the content decider module 194 of the new order. The content decider 194 then gathers the necessary information for making a decision about whether to provide new content to one or more of the industrial portable or stationary devices based on this new content purchase. Of course, the content decider module 194 may collect and evaluate a complete list of available content and versions from the source content repository 198, a complete list of current content and versions on the particular industrial portable or stationary device from the end-user device information repository 190, the service contract information from the business systems computer 199, the configuration forms or templates created by the fleet manager and stored in, for example, the end-user device information repository 190 defining types of content to be placed on particular portable or stationary devices, the device ID of the particular industrial portable or stationary devices, and the current configuration settings of the device as stored in the repository 198, if needed. The content decider module 194 then makes an evaluation, and when the module 194 determines that new content is available for the particular industrial portable device, the module 194 triggers the notifier module 192. The notifier module 192 then sends a notification to the production person at the production station 210, indicating that there is new content available for a customer or for a customer's industrial portable device. This notification may be provided via, for example, e-mail, twitter, text, or some other electronic format that does not use the networks 116, 118, and 120 directly.

Alternatively or at a later time, the production person at the production station 210 may initiate a "check-for-updates" request to the external cloud network 114. The external cloud network 114 receives the "check-for-updates" request and routes the request to the content decider 194 which again may obtain a complete list of available content and versions from the source content repository 198, a complete list of current content and versions on the particular industrial portable device and the device configuration templates from the end-user device information repository 190, service contract information from the business systems computer 194, the device ID of the particular industrial portable or stationary device(s), and the current configuration settings of the particular industrial portable or stationary device(s). The content decider module 194 makes an evaluation as to which if any content should be applied to one or more industrial portable or stationary devices and sends the list of targeted content and versions that the particular industrial portable or stationary device is entitled to back to the production station 210. Of course, if desired, the original notification from the notifier 192 may include the listing of new content to be downloaded to the industrial portable or stationary devices and the production station 210 need not have the content decider 194 reevaluate for new content. However, this reevaluation may be desirable if a predetermined amount of time has expired between the notification and the download. This same statement is true for the directly connected embodiment of FIG. 2.

In any event, the production person at the production station 210 then initiates the content download from the source content repository 198 in the external cloud network 114, downloads the content, and burns this content to portable media, which is shipped or otherwise physically provided or transported to the fleet administrator at the plant. If desired, the content decider module 194 may provide a key, password, code, or other security authorization to enable the production person to download the specific content and this key or authorization may be needed to initiate a download, to thereby prevent unauthorized downloads. Again, the content decider module 194 of FIG. 2 can perform this action as well. Moreover, the downloaded content may be coded to enable it to be only installed on the industrial portable or stationary device (device ID) for which the content decider 194 authorized the content.

Thereafter, the fleet administrator receives the portable media, and uses the fleet management station 146, 168 to update the content in the fleet management station local content repository 146, 170. Next, when the particular industrial portable device is connected to the network 118 or 120, or to the fleet management station 146, 168 via one of the network access points 148, 172 for example, or when a particular stationary device connects to or is available on the network 118 or 120, the fleet administrator initiates the installation of the content to that industrial portable or stationary device as stored in the local content repository 147, 170. Once the content has been installed, the fleet management station 146, 168 reports back to the production personnel that the content has been installed to this particular industrial portable or stationary device or prompts the fleet administrator to send information about the latest current state of the industrial portable device (including new configuration data or settings if desired), back to the production person via, e-mail, text message, or other electronic message, for example. The fleet administrator then sends the latest current device content state information via e-mail, text message, or other means, to the production person, who enters the information into the external cloud network 114 system via the production station 210. The external cloud network 114 then updates the end-user device information repository 190 with the latest current state of the industrial portable or stationary device (with the device ID).

Of course, while two different fleet management systems deployments and communications are described herein, there are many other applicable deployment methods that could be implemented using the basic components of the fleet management system 112 described herein. For example, the portable devices 150, 180 could be connected directly to the external cloud network 114 via plant connections to receive or process updates or new content decisions, all fleet management activities could be provided in the external cloud network 114, some or all of the modules and devices depicted in the external cloud network 114 could be performed in a plant network, etc.

Figure 4:
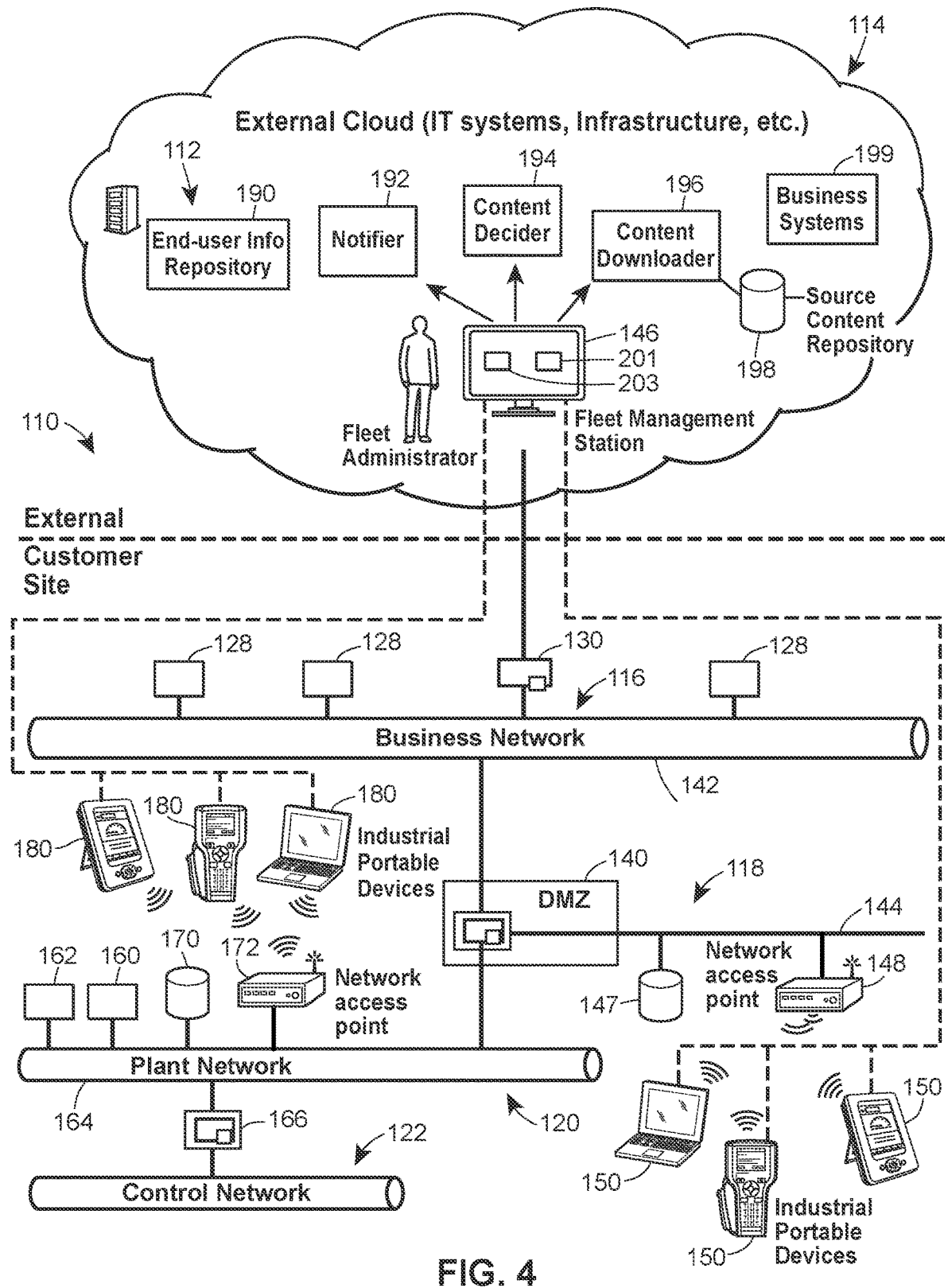
FIG. 4 is a block diagram of a fleet management system integrated within a process plant or other industrial environment in a distributed manner using a fleet management server connected to other fleet management components in an external network.

More particularly, FIG. 4 illustrates another example fleet management system in which similar elements as those described in FIGS. 2 and 3 are given like reference numbers. In the system of FIG. 4, the industrial portable devices 150 and 180 (and some stationary devices if desired) may connect directly to the external network 114 and, in this case, the fleet management station 146 or 168 may be provided in the external network 114, such as in the cloud, or at a remote service site. As illustrated in FIG. 4, the portable devices 150, 180 may connect to the fleet management station 146 via the firewall and DMZ devices 130 and 140, or via a direct internet or other public network connection (shown in dotted lines) to communicate with and receive information from the fleet management station 146 which operates in generally the same manner as described above, except that the fleet management station 146 connects with the devices 150 and 180 via a public or other external network connection. In some cases, communications between the portable device 150 and 180 (or other stationary devices in the plant or other industrial setting) may be implemented via e-mail, text messages, etc., and in other cases, file downloads (and/or messaging) may be implemented only via a direct secured connection. In still other cases, file downloads may be implemented via e-mail or other non-secured communication channels but these communications may be encrypted and secured via security codes as described above.

Still further, various components of the fleet management systems 112 described herein may be located in other places. As illustrated in FIG. 4, one or more of the fleet management stations 146, 168 may be provided in and executed in the cloud or at a remote site. In these and other cases, a local repository 147, 170 may still be located at the plant or other industrial sites and communicate with the fleet management station 146, 168 via external network connections. Likewise, it will be understood that the fleet management station user interface (e.g., the user interface that implements user interface activities with the fleet management stations 146, 168) may be implemented using thin client applications that provide a remote interface with respect to the computer device that executes the configuration modules 201 and the fleet management software applications 203. As a result, these thin client interfaces may be provided on wireless devices, on other workstations, etc., either at the same location or at a different location than the fleet management computer device or server. As another example, some or all of the devices or components 190-199, such as the end-user information repository 190, may be provided on one of the networks within the plants of FIGS. 2-4 or other industrial settings if so desired, so that most or all of the fleet management components are within the same plant or location. Of course, any particular ones of the components 190-199 may be at or on one of the plant networks while the others may be within the cloud or a remote network, if so desired.

Figure 5:
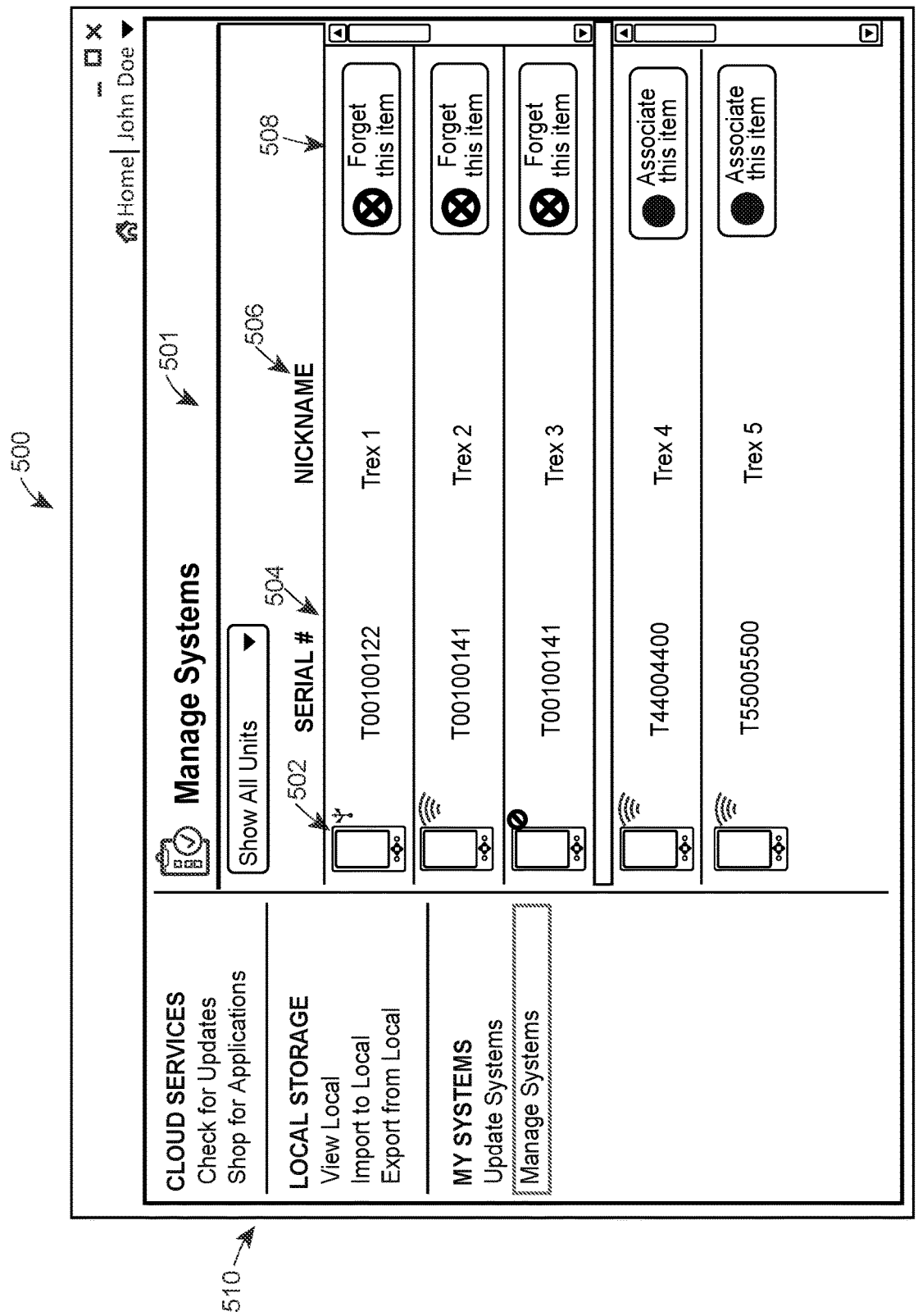
FIG. 5 is a depiction of an example screen display that may be produced by a fleet management server to enable a fleet manager to manage particular devices within a fleet of devices.

FIG. 5 illustrates an example user interface screen 500 that may be implemented or provided by a fleet management station 146, 168 to a user (by executing the software modules 201 and 203 of FIGS. 2-4, for example) to enable the user to manage various devices, to observe that new content is available for one or more devices, to enable a download of new content, to enable uploading of for example user generated content and configuration content to a remote site, to generate or specify configuration information, such information within one or more configuration forms, etc. In particular, a screen section 501 of FIG. 5 illustrates information for each of a set of portable industrial devices within the plant or associated with a particular fleet of devices including a graphical icon of the devices, generally at 502, which icons may be different for different types of devices in a fleet to provide the user with an indication of the type of device being managed. The screen section 501 also includes serial numbers for the devices (at 504), nicknames for the devices (at 506) which may be configurable, and an indication of whether the device is part of a fleet being managed or not (at 508). The icons at 508 above the line indicate that the device is part of a fleet being managed and enable the device to be removed from the fleet or forgotten by selection of these icons. Likewise, the icons 508 below the line indicate devices that are available but that are not associated with the current fleet, and enable a user to associate these devices with the fleet by selecting the icon.

Still further, the icons 502 may indicate the type of communication connection that the fleet management station currently has with the device. In this case, the first device is connected via a USB connection, the second, fourth, and fifth devices are connected via a Wi-Fi connection, and the third device is not currently connected. While not shown in FIG. 5, the icons 502 may also include sub-icons or may provide further windows (if selected or accessed via a hover event) that indicate when one or more of the devices in the screen 500 has new content available for the device and that may potentially indicate the type of content available. In some cases, these sub-icons may indicate that the device needs to have content removed.

Likewise, the screen 500 includes an action menu 510 that enables a user or fleet manager to take actions on particular devices or groups of devices, such as ones selected in the screen section 501. For example, selecting items in the menu 510 may enable the user to check for updates (as described previously herein), to shop for applications or other new content, and to manage local storage, such as to view what is in the local content repository (such as the repositories 147, 170 of FIGS. 2-4), to import content to the local content repository (either from a device to the local repository for from the content repository 198 of FIGS. 2-4 to the local repository), to expert content from the local repository either to a device in the fleet such as a selected device, or to the user information repository 190 or the content repository 198 of FIGS. 2-4. Still further, the menu 510 of FIG. 5 may enable a user to manage the fleet by updating one or more devices, or by managing the system to remove or add devices to the fleet, to create or change configuration forms or settings for devices as described previously, etc. Of course, the screen 500 of FIG. 5 illustrates only one example of the type of information and a manner of displaying information to a fleet manager to enable the fleet manager to take actions as described herein. It will be understood that there are many other manners of displaying this and other information and providing a fleet manager with the ability to take various fleet management actions as described herein.

Moreover, while the fleet management system 112 described herein is described in the context of an industrial portable device management system, it could also be used to manage other industrial devices such as personal computers, handheld devices, etc. used for asset management systems, rotating equipment management systems, etc. Moreover, the fleet management system 112 could be used to support any types of industrial portable devices, such as field communicators, calibrators, meters, vibration analyzers, etc., that are used in industrial settings such as industrial plants, to configure, troubleshoot, calibrate, measure, and perform other operations on field devices (such as process measurement devices, valves, positioners, etc.), rotating machines, and other equipment. Likewise, the fleet management system 112 can be used to support stationary devices within a plant, such as user or operator workstations, data historians, asset management stations, vibration analysis stations, rotating equipment stations, process controllers, input/output devices used in process plants and control systems, etc.

This patent describes a fleet management system for managing portable field maintenance tools configured for use in industrial process control systems, environments, and/or plants, which are interchangeably referred to as "automation," "industrial control," "process control," or "process" systems, environments, and/or plants. Typically, such systems and plants provide control, in a distributed manner, of one or more processes that operate to manufacture, refine, transform, generate, or produce physical materials or products, but these plants could operate in other manners and still use the fleet management structure described herein.

Moreover, the while the software and hardware described herein for the various components of the fleet management system 112 have been described as being implemented on general purpose computers or workstations having processors and memories therein, any or all of these components could be implemented using other types of computers, such as special purpose computers, application specific integrated circuits (ASICs), etc. Moreover these components can be configured to be in more or less computer devices than those illustrated herein, for example, multiple ones of the fleet management system components described herein could be stored and executed on the same computer processor or system, or a single component may be split between multiple computer devices. Likewise, these components can be created or configured using any standard or known computer software programming techniques and may perform any standard or known communication techniques to communicate with one another.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A method of managing content that is provided on a plurality of industrial devices in a distributed manner, comprising:
storing, by one or more processors at a first location, indications of existing content within each of the plurality of industrial devices in a device content information repository at a first location;
storing, by the one or more processors, content to be stored in and executed by different ones of the plurality of industrial devices in a content repository at the first location;
determining, via the one or more processors, indications of content to be provided to one or more of the plurality of industrial devices for use at a second location remote from the first location based on the indications of the existing content within one or more of the plurality of industrial devices and based on content available in the content repository; and
using the determined indications of content to be provided to one or more of the plurality of industrial devices to send, by the one or more processors, content from the content repository at the first location to a fleet management station via a secure communication connection, the content to be provided to one or more of the plurality of industrial devices at the second location.

2. The method of claim 1, wherein storing content in the content repository at the first location further comprises storing one or more of software applications, field device drivers, user assistance information, technical support information, and firmware features.

3. The method of claim 1, wherein storing content in the content repository at the first location further comprises storing upgrades of software applications.

4. The method of claim 1, further comprising generating a notification to the fleet management station and sending the notification to the fleet management station via an electronic communication when new content is determined to be available for one of the plurality of industrial devices.

5. The method of claim 1, further comprising receiving an indication of an acquisition of new content via a purchase or license at the first location and determining indications of content to be provided to one or more of the plurality of industrial devices based on the acquisition of new content.

6. The method of claim 1, further comprising storing device configuration information at the first location and wherein determining indications of content to be provided to one or more of the plurality of industrial devices further comprises determining indications of content to be provided to one or more of the plurality of industrial devices based on the device configuration information.

7. The method of claim 6, further comprising enabling a user to specify the device configuration information at the second location and to send the device configuration information to the first location for storage.

8. The method of claim 6, further comprising enabling a user at the second location to provide the device configuration information electronically via one or more configuration forms.

9. The method of claim 6, further comprising enabling a user at the second location to provide the device configuration information electronically in using indications of authorized users of one or more of the plurality of industrial devices, indications of authorized uses to which one or more of the plurality of industrial devices is limited, indications of security procedures to implement for use of one or more of the plurality of industrial devices, or indications of one or more levels of configurations to be associated with an industrial device, each level of configuration having different configuration parameters.

10. The method of claim 1, further comprising storing the content to be provided to one or more of the plurality of industrial devices stored in the content repository in a secondary content repository located at the second location and downloading the content to be provided to one or more of the plurality of industrial devices from the secondary content repository to one or more of the plurality of industrial devices.

11. The method of claim 10, further comprising downloading the content to be provided to one or more of the plurality of industrial devices from the secondary content repository to one or more of the plurality of industrial devices via a wireless communication connection.

12. The method of claim 1, further comprising providing an authorization from the first location to the second location when downloading content for a particular industrial device and downloading the content to the particular industrial device at the second location using the authorization.

13. The method of claim 1, wherein sending content from the content repository at the first location to the fleet management station disposed within a network at the second location via the secure communication connection comprises storing the content on a portable storage medium at the first location, physically transporting the portable storage medium to the second location, and providing the content from the portable storage medium to the fleet management station at the second location.

14. The method of claim 1, wherein storing indications of the existing content within each of the plurality of industrial devices in the device content information repository at the first location further comprises sending indications of the existing content within each of the plurality of industrial devices from the second location to the first location.

* * * * *